March 2, 1965 E. W. ECKEY 3,171,725
METHOD AND APPARATUS FOR CONTACTING LIQUIDS AND GASES
Filed July 23, 1962 11 Sheets-Sheet 4
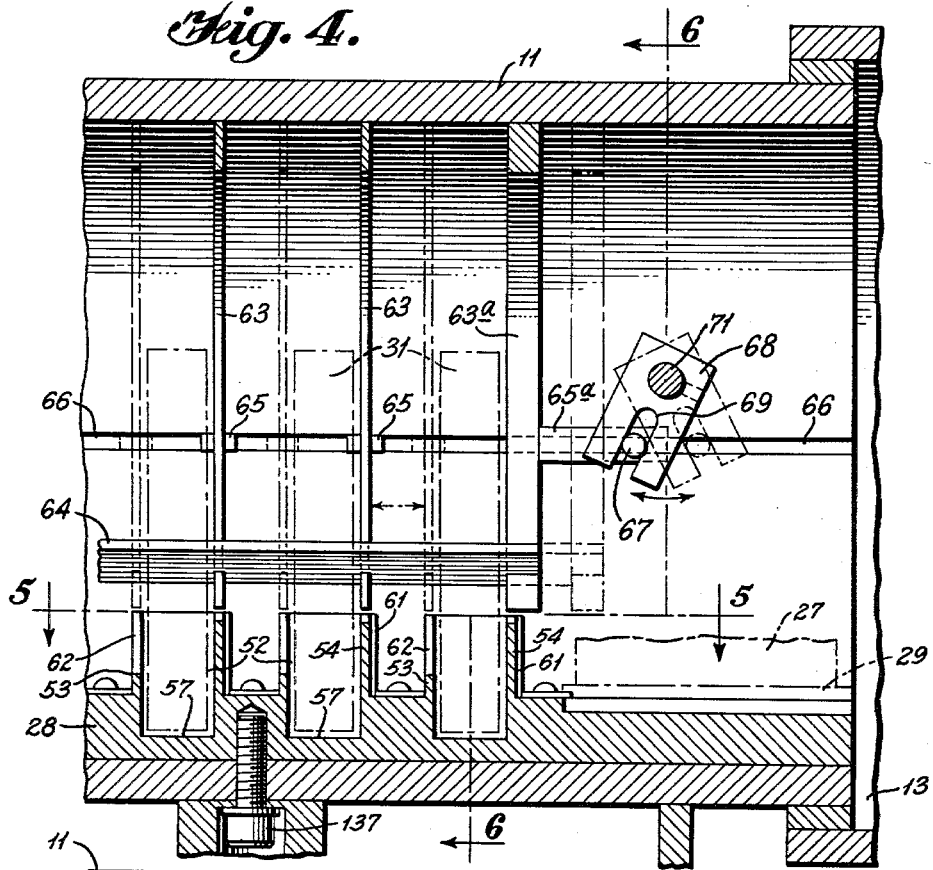
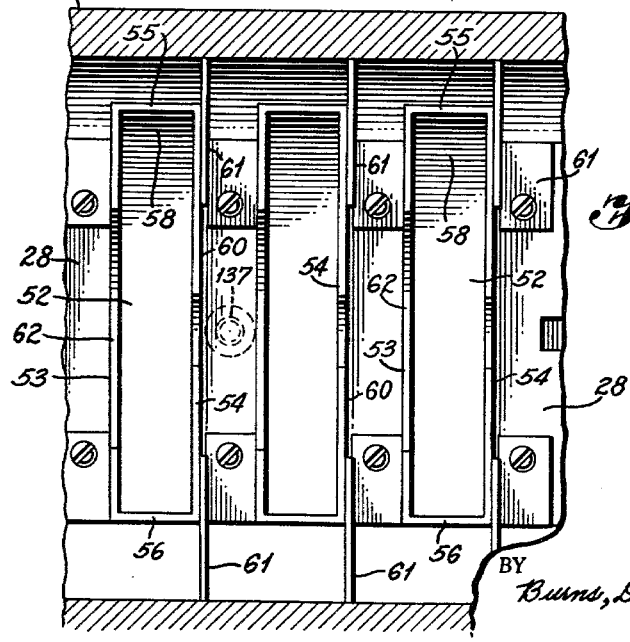
INVENTOR
*Eddy W. Eckey*
BY *Burns, Doane, Benedict & Irons*
ATTORNEYS March 2, 1965 E. W. ECKEY 3,171,725
METHOD AND APPARATUS FOR CONTACTING LIQUIDS AND GASES
Filed July 23, 1962 11 Sheets-Sheet 5
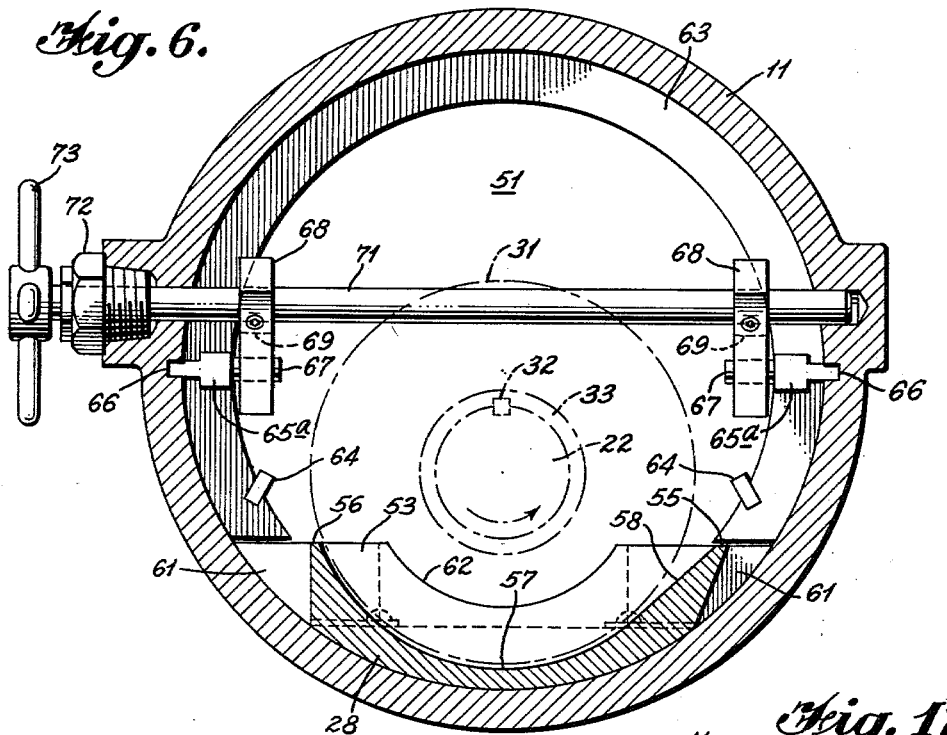
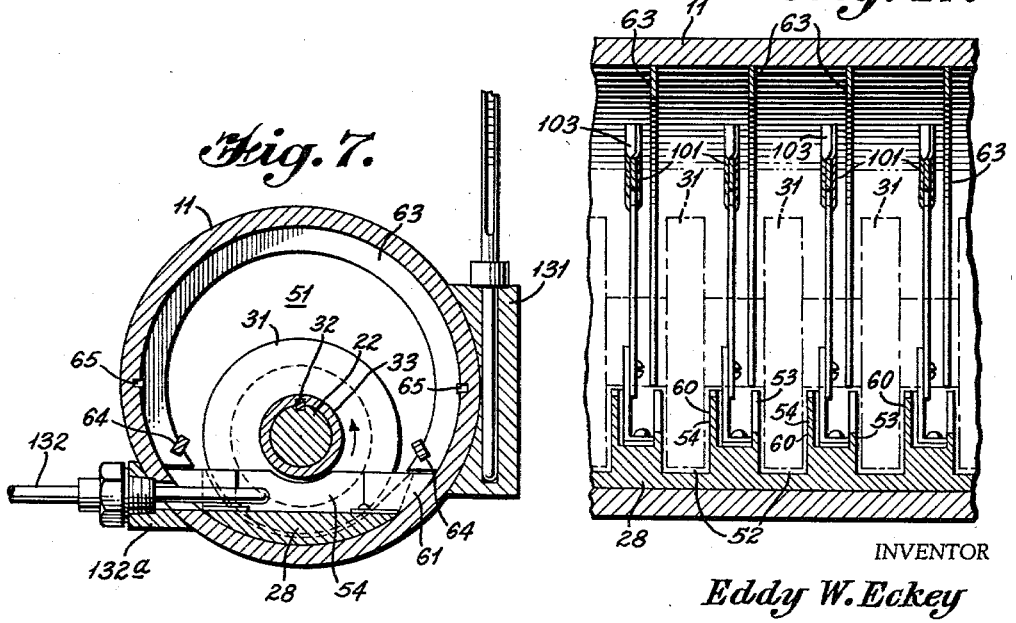
INVENTOR
Eddy W. Eckey
BY
Burns, Doane, Benedict & Irons
ATTORNEYS March 2, 1965 E. W. ECKEY 3,171,725
METHOD AND APPARATUS FOR CONTACTING LIQUIDS AND GASES
Filed July 23, 1962 11 Sheets-Sheet 6

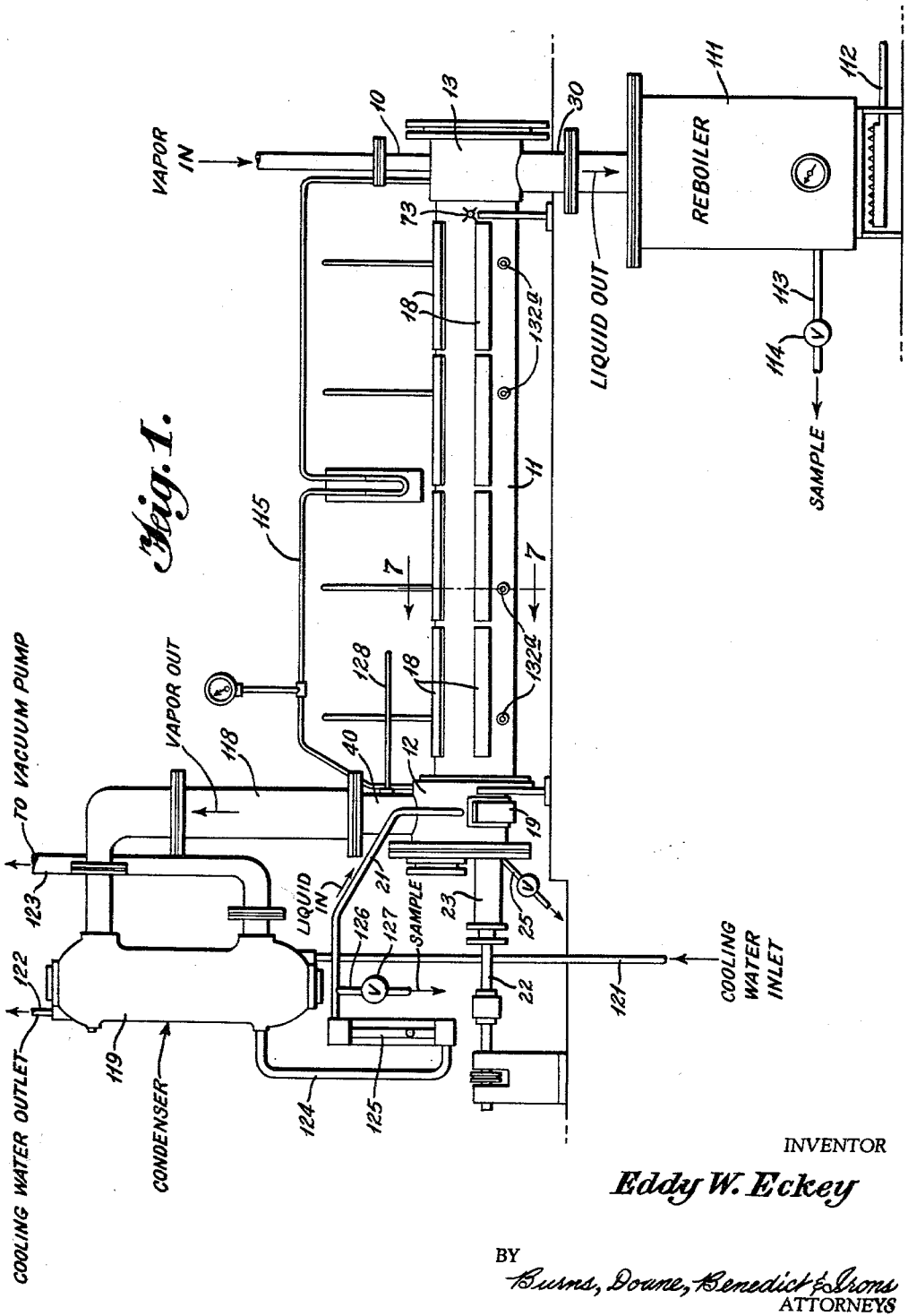

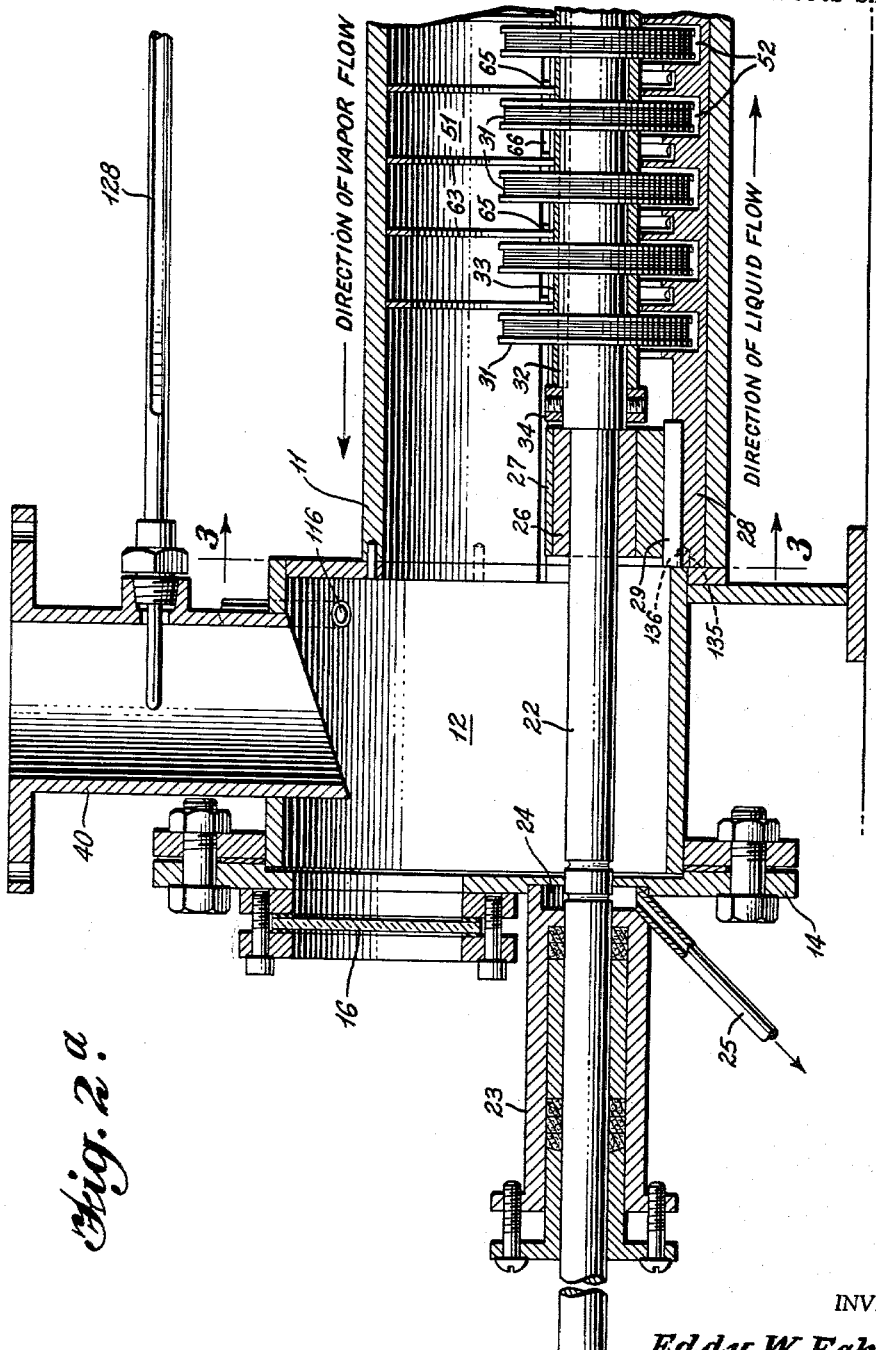

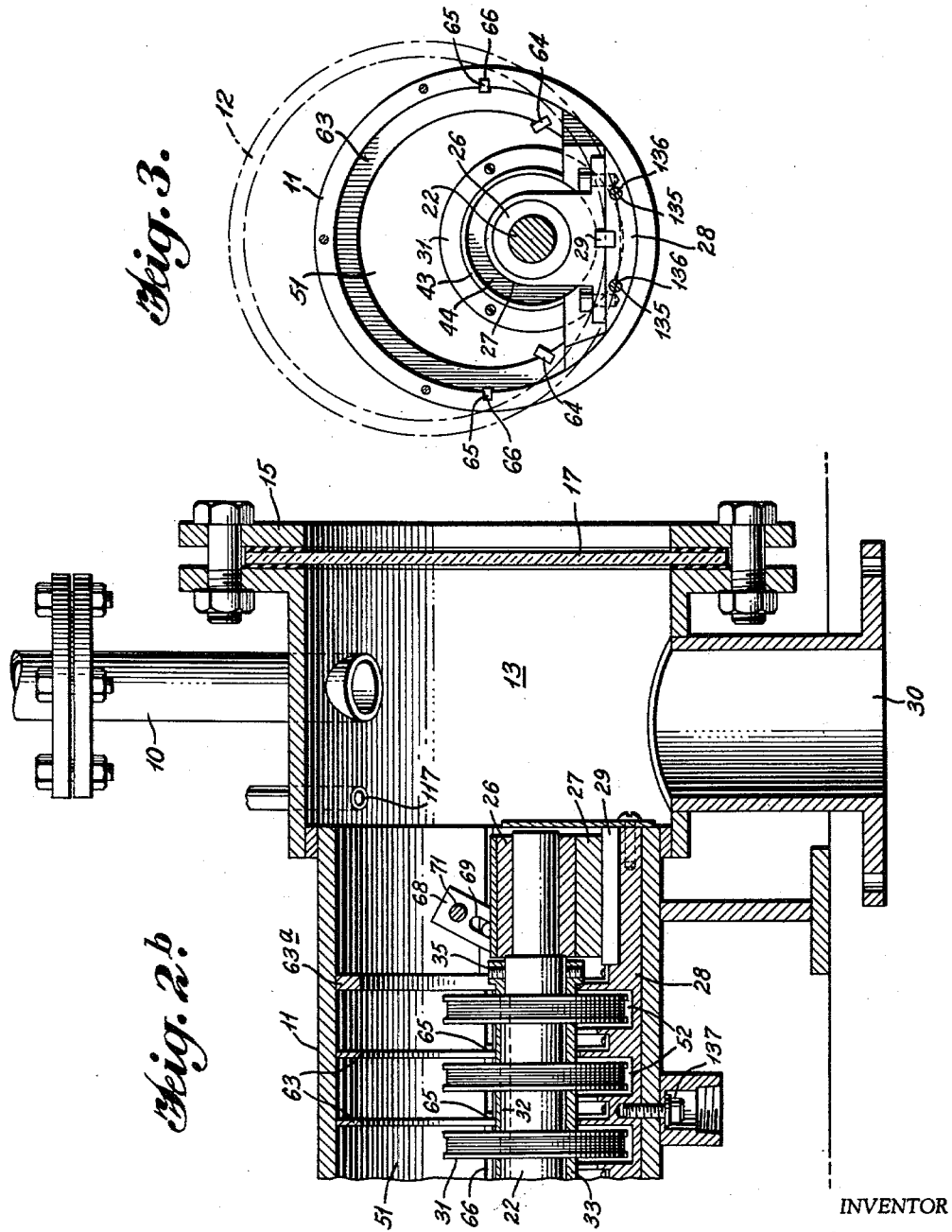

INVENTOR
*Eddy W. Eckey*

BY
*Burns, Doane, Benedict & Irons*
ATTORNEYS

March 2, 1965    E. W. ECKEY    3,171,725
METHOD AND APPARATUS FOR CONTACTING LIQUIDS AND GASES
Filed July 23, 1962    11 Sheets-Sheet 7
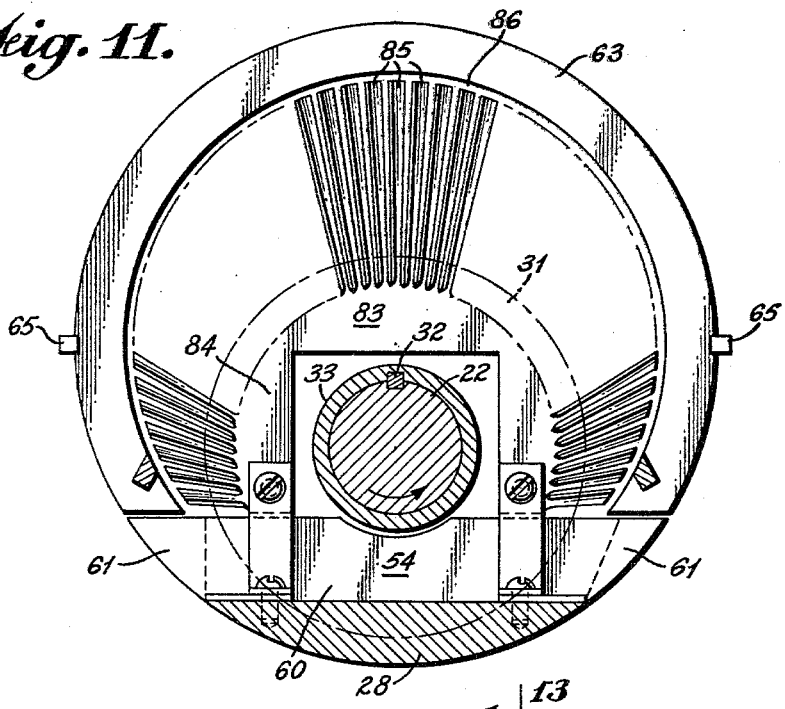
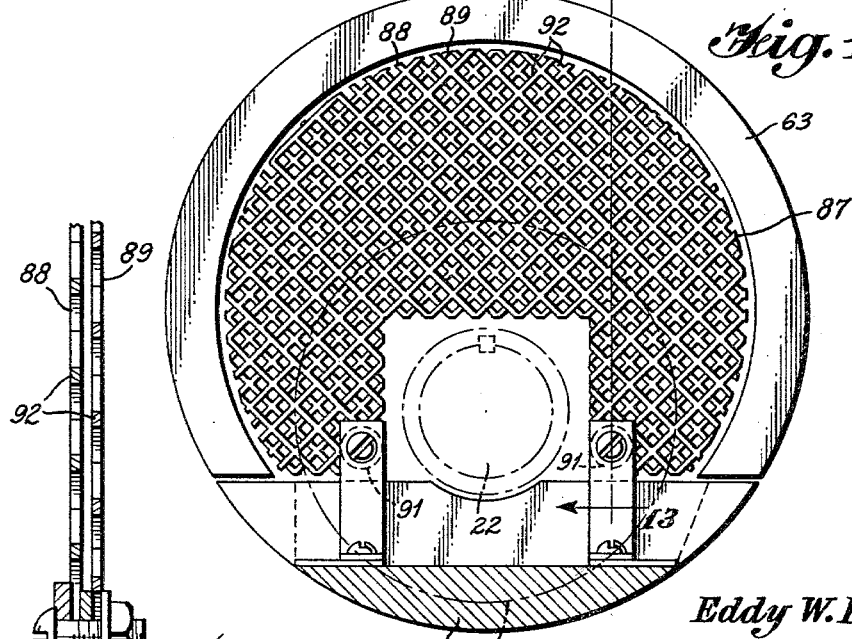
INVENTOR
Eddy W. Eckey
BY
Burns, Doane, Benedict & Irons
ATTORNEYS INVENTOR
Eddy W. Eckey
BY Burns, Doane, Benedict & Lions
ATTORNEYS

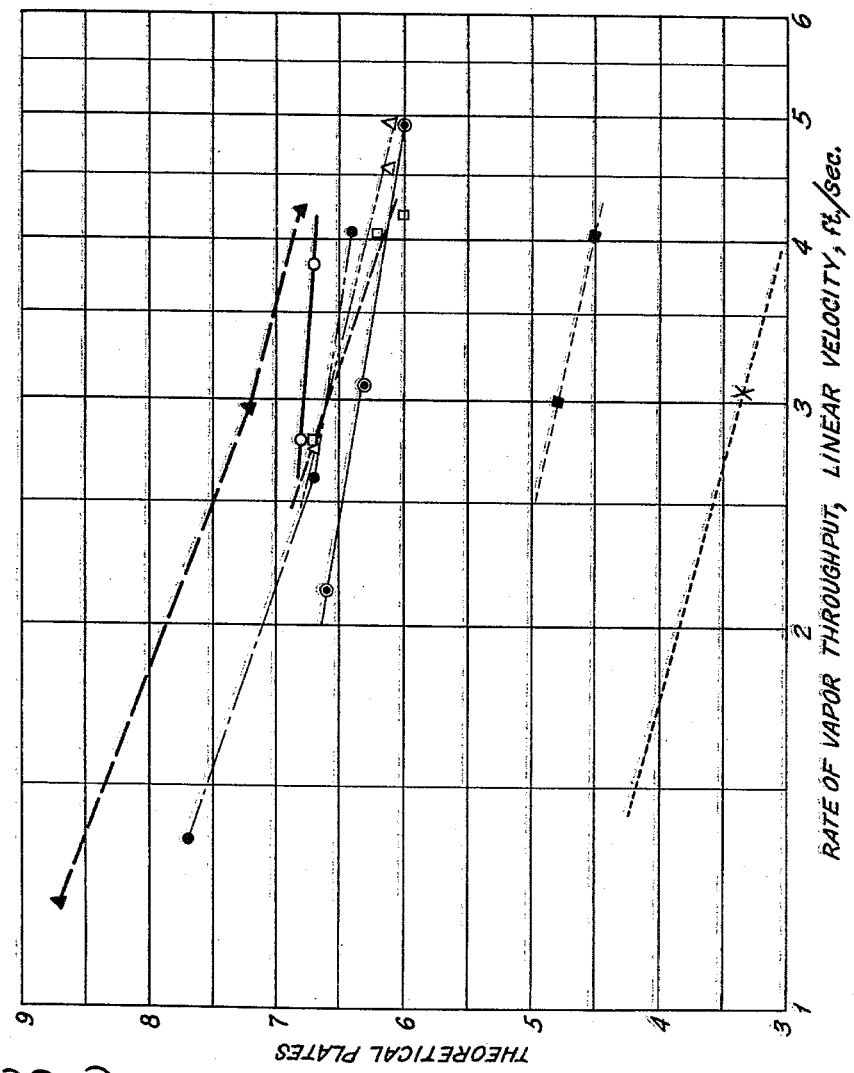

March 2, 1965 E. W. ECKEY 3,171,725
METHOD AND APPARATUS FOR CONTACTING LIQUIDS AND GASES
Filed July 23, 1962 11 Sheets-Sheet 11

INVENTOR
Eddy W. Eckey
BY Irons, Birch, Swindler & McKie
ATTORNEYS

United States Patent Office 3,171,725
Patented Mar. 2, 1965

3,171,725
METHOD AND APPARATUS FOR CONTACTING
LIQUIDS AND GASES
Eddy W. Eckey, 313 S. Wayne Ave., Cincinnati 15, Ohio
Filed July 23, 1962, Ser. No. 216,008
20 Claims. (Cl. 55—89)

This invention relates to a method and apparatus for continuous contacting of liquid with vapors. More particularly, the invention relates to a method and apparatus for effecting component-interchange between vapors and liquids, for example, such as are encountered in refining fats by continuous multistage countercurrent treatment with a stripping vapor to remove free fatty acids and odoriferous components.

The present method and apparatus find special applicability in the contacting of vapors such as stripping vapors, or vapors of the liquid material undergoing treatment, with liquids that are sufficiently viscous to reduce the contacting efficiency attainable with conventional bubble-trays to values substantially less than 100%. As may be seen from the table on page 699 of the Perry Handbook (Perry's Chemical Engineer's Handbook, 3rd ed., McGraw-Hill, 1950), it is not unusual for efficiencies to fall below 10% in conventional equipment, with the result that ten or more actual plates would be needed to attain the effect of one theoretical plate; the graph on page 613 of the same handbook shows that in petroleum refinery distillation in conventional equipment, the plate efficiency falls below 30% when the average viscosity of the mixture being treated is greater than 0.6 centipoise at the average temperature of the treatment.

By repeated renewal of large areas of fresh surface of liquid in contact with vapor, and by other means that will be apparent in the description set forth hereinafter, the present apparatus and method make it possible to carry out processes that require the countercurrent contacting of vapor with liquid at an effectiveness amounting to several theoretical plates, in equipment of moderate length and cost, even though the viscosity of the liquid at the temperature of the process is so high as to require long and costly columns of conventional type. The apparatus and method are not limited, however, to applications involving viscous liquids, but have advantages also in operations such as fractional distillation at pressures near one atmosphere and other operations involving liquids of relatively low viscosity.

Among the operations involving liquids having viscosities greater than 0.6 centipoise are various stripping distillations, in which one or more components are removed from a liquid by distillation with the aid of a stream of steam or other carrier gas. Practical operations in this category, for which this invention has special utility, include steam refinng and deodorization of fats and fatty oils; removal of solvent from solvent extracted animal and vegetable fats and oils, and mineral oils; separation of fatty acids and other components from tars, pitches and tall oil rosin; stripping of absorbed components from absorber oils such as those used in connection with the recovering of desirable hydrocarbons from natural gases, refinery gases and the like.

Likewise, the countercurrent contacting of absorber oil with mixed gases for the continuous separation of components of the mixed gases is an operation for which the invention has special utility.

Fractional distillation of liquid mixtures is a general field of application of the present apparatus and method. The advantages are especially apparent in the distillation of relatively high boiling materials that require vacuum if they are to be distilled without damage. Because liquids tend to have nearly the same viscosities, about 0.2 to 0.3 centipoise, at their normal boiling points at one atmosphere pressure (Perry's "Chemical Engineer's Handbook," 3rd ed., pp. 612 and 698), it follows that liquids that must be distilled under vacuum are relatively viscous at the temperature of distillation and correspondingly difficult to separate effectively. The short length of contactor and low pressure-drop per theoretical plate obtained by the apparatus of this invention make it particularly useful in this type of operation, and extend the range of high-boiling substances that may be processed without resort to "molecular distillation." The advantage of overcoming the resistance to separation imposed by viscosity of the liquid is greatest in the pressure range of about 50 mm. to about 0.5 mm. of mercury. Within such pressure range, which is above the range appropriate for "molecular distillation," large volumes of vapor may be economically handled by the apparatus of this invention. Mixed fatty acids such as those obtained by hydrolysis of tallow, palm oil and other fats are examples of material which may be fractionally distilled at low pressures, in the range above 0.5 mm. Such liquids will have viscosities not less than about 0.8 centipoise at the operating temperatures.

The utility of this apparatus, however, is not confined to very low pressure operations. The performance in fractional distillation at pressures near one atmosphere is excellent, especially when devices are included in the apparatus for modifying the flow of the vapor, as described in detail hereinafter.

It is an object of this invention to provide an improved method and apparatus for the continuous refining of liquids with stripping vapors which more nearly approaches ideal efficiency for such countercurrent operations than is possible in methods or apparatus known to the prior art.

It is a further object of the invention to provide an improved method and apparatus for continuously refining liquids wherein the liquid is repeatedly and effectively contacted with counterflowing stripping vapor to achieve highly effective distillable-component removal per unit length of column with a minimum of pressure drop, and maximum ease and precision of control of temperature and processing time, thereby producing products of improved quality through more precise fractionation or stripping.

It is an additional object of this invention to provide an improved method for the continuous multistage refining of relatively large quantities of liquid wherein the liquid is alternately projected in droplet form through an impeller into a stream of counterflowing treating vapor and maintained in relatively non-turbulent pools, thereby promoting smoother progression of the liquid from stage to stage and more effective fractionation or stripping.

It is another object of this invention to provide a high capacity apparatus for continuous contact of a gas and a liquid wherein more complete and uniform contact is achieved while utilizing higher flow rates than is possible in apparatus known to the prior art.

It is a further object of this invention to provide an apparatus for continuous contact of a gas and a liquid providing precise control and great flexibility as to the degree of contact achieved.

Generally, the invention includes an apparatus for contacting a gas and a liquid comprising a generally horizontal elongated vessel having a gas inlet and outlet at opposite ends of said vessel and a liquid inlet and outlet at opposite ends of said vessel, said vessel having a gas passageway in the upper portion thereof extending between said gas inlet and outlet, a plurality of transverse dams mounted at spaced locations in said vessel between said liquid inlet and outlet to divide the lower portion of said vessel into a plurality of liquid receiving chambers, spray means positioned in said chambers to remove a large volume of liquid from each of said chambers to maintain the liquid level in said chambers below the tops of said dams and to project said removed liquid as a plurality of spaced curtains of droplets across said passageway for intimate contact with gas passing through said passageway so that said droplets impinge against and coalesce on an inner surface of said vessel, a plurality of transverse guide members mounted in said vessel at axially spaced locations, said droplets having a size and velocity as to be substantially non-entrained by the gas in said passageway, said members extending continuously around the upper portion of said vessel above said dams and projecting inwardly a short distance from said surface into said passageway to divide the upper portion of said vessel into a plurality of separate channels in which the coalesced liquid descends in flow paths, each of said channels being positioned in the path of one of said spray means to receive substantially all of the liquid projected by said one spray means to prevent substantial intermixing on said surface of liquid sprayed from separate chambers, and means to divide the coalesced liquid in said channels into separate portions, to return one of said portions for projection by the same spray means from which it was last projected and to direct another of said portions to the next downstream spray means.

In terms of method, the invention includes a method for contacting liquids and gases which comprises conducting a liquid through a plurality of successive stages in the lower portion of a generally horizontal elongated tube, in each such stage collecting said liquid in a relatively non-turbulent pool, continuously projecting liquid from each of said pools across the interior of the tube as a plurality of generally arcuate curtains of droplets distributed substantially uniformly around the circumference of each of said curtains without substantially agitating said pools, coalescing and collecting said projected liquid within said tube in a plurality of separate downwardly flowing streams while limiting to the width of one of said streams movement axially of said tube of substantially all of said projected liquid from the time it is projected until its return to said pools, dividing the coalesced liquid in each of said streams into two predetermined portions of the liquid projected from each of said stages, returning one of said portions from each of said streams to the liquid pool of the same stage from which it was last projected, conducting the other portion from each of said streams to the pool of the next succeeding stage, and conducting vapor through said plurality of curtains in an essentially straight-through flow path longitudinally in said tube in a direction counter to the direction of progression of said liquid to effect multiple successive contacts of extensive fresh surfaces of liquid with vapor and to promote progressive interchange of components between said liquid and said vapor, said droplets having a size and velocity as to be substantially non-entrained in said vapor.

The manner in which the stated objects and others are accomplished will become apparent from the detailed description of the specific embodiments of the invention set forth hereinafter and illustrated on the drawings in which:

FIGURE 1 is a schematic diagram of the apparatus of the invention employed as a batch fractionator for test distillations;

FIGURES 2a and 2b are longitudinal vertical sections of opposite ends of the apparatus of the invention;

FIGURE 3 is a transverse section taken on the line 3—3 of FIGURE 2 of the fractionating tube and showing the manifold at the end of the tube in phantom lines;

FIGURE 4 is a fragmentary longitudinal vertical section of a portion of the fractionating tube showing in detail the means for longitudinally adjusting the position of the guide members with the impellers shown in phantom lines and the drive shaft omitted;

FIGURE 5 is a fragmentary, longitudinal, horizontal section taken along the line 5—5 of FIGURE 4 showing a top view of the dams and troughs;

FIGURE 6 is a transverse vertical section taken along the line 6—6 of FIGURE 4 showing further details of the guide member adjusting mechanism;

FIGURE 7 is a transverse vertical section taken along the line 7—7 of FIGURE 1 of the fractionating tube showing the thermometer wells with thermometers inserted therein for determining the temperatures of the liquid in the tube and the tube wall;

FIGURE 11 is an elevation of an alternative form of inflector member;

FIGURE 12 is an elevation of another embodiment of inflector member;

FIGURE 13 is a fragmentary vertical section taken along the line 13—13 of FIGURE 12;

FIGURE 17 is a fragmentary vertical section taken along the line 17—17 of FIGURE 16;

FIGURES 18 and 19 are comparative graphs showing the effectiveness of the apparatus of the invention with and without inflectors;

Figure 8:
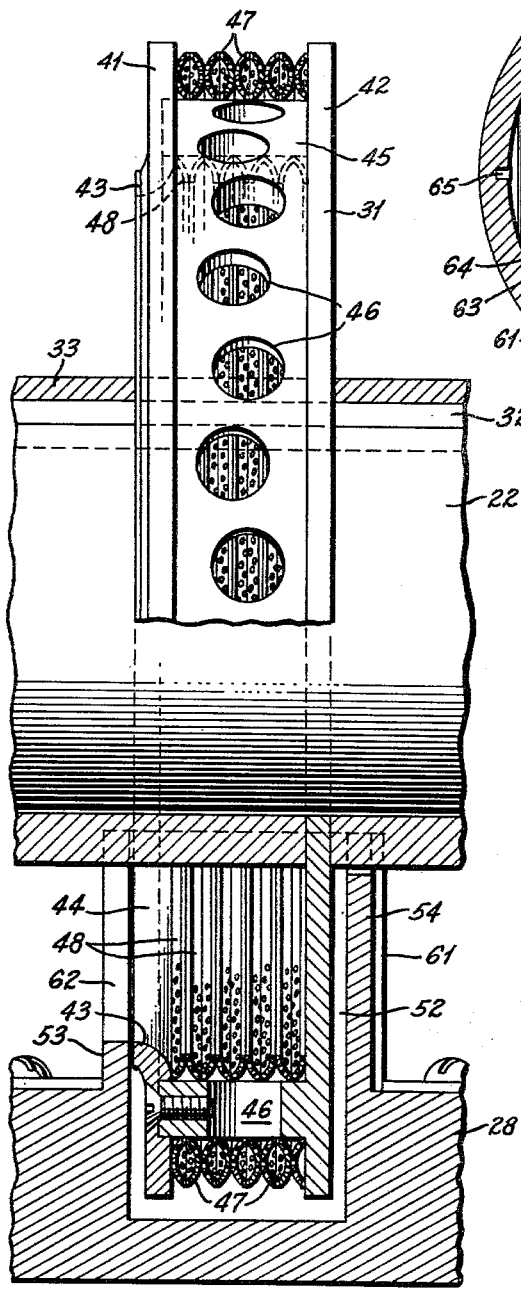
FIGURE 8 is a side elevation partially in section showing the details of construction of a preferred form of impeller.

With particular reference to FIGURES 1, 2a and 2b one form of the apparatus of the invention comprises a shell which takes the form of a cylindrical tube 11 in which the stripping or fractionating process takes place. The opposite ends of the tube are open and are connected to manifolds 12 and 13. The connections between the tube 11 and the manifolds 12 and 13 are made vacuum and pressure tight, for example, by the use of suitable gaskets or other seals between the tube and manifolds. The other ends of the manifolds 12 and 13 are closed by cover plates 14 and 15 respectively. The cover plates 14 and 15 are provided with transparent windows 16 and 17 respectively to permit the operation to be viewed from the outside. The cover plates and windows are attached to each other and to the manifolds by any suitable pressure and vacuum tight connections. A plurality of electrical strip heaters 18 are connected at spaced locations to the exterior wall of the tube 11 to permit controlled heating of the tube. Another electrical strip heater 19 is connected to the bottom wall of the manifold 12. In most operations the tube 11 and the manifolds 12 and 13 would be encased in insulating material positioned outside of the strip heaters.

The tube 11 is equipped with a plurality of thermometer wells 131 along the side of the tube by means of which the temperature of the tube wall may be determined. Further a plurality of thermometers 132 are situated in openings 132a near the bottom of the tube 11 to enable the temperature of the liquid in the tube to be determined at various points.

The liquid material to be processed is fed through the fractionating tube through inlet line 21 (FIGURE 1) which enters the manifold 12 through a suitable fluid tight connection. If desired, the rate of liquid feed may be maintained constant by means of a positive displacement pump or any other suitable controlling device not shown. If it is necessary to heat the material to be processed before it enters the tube, as is usually the case in the deodorization of lard, vegetable oil and the like, this can be done in a conventional type of heater. If desired, an extensible inlet line may be provided to permit the liquid to be introduced into the tube at any point along its length as shown in my copending application Serial No. 616,161, filed October 16, 1956. Alternatively, the liquid feed may be introduced at any desired location along the tube 11 through a line attached to an opening appropriately placed in the tube wall, as for example through a line attached to one of the openings 132a. The treated liquid is removed through liquid outlet 30. Vapor is introduced at the liquid outlet end of the tube 11 through vapor inlet 10 and is removed from the liquid inlet end through vapor outlet 40.

A drive shaft 22 extends longitudinally through the fractionating tube 11. The shaft extends through a conventional stuffing box 23 which is connected to cover plate 14 of the manifold 12. At the inner end of the stuffing box there is provided a lubricant well 24 to which is connected a valved drain pipe 25. The end of the shaft which extends through the stuffing box may be connected to a source of rotary power such as an electric motor, steam turbine, or the line. The drive shaft 22 is journaled for rotation in a pair of bearings 26 mounted in bearing housings 27 which are bolted to the opposite ends of a trough assembly 28. The housings 27 are further connected to trough assemblies 28 by keys 29.

With reference to FIGURES 2a and 2b, the central portion of the shaft 22 between the bearings 26 is enlarged relative to the end portions. A plurality of impellers 31 are non-rotatably mounted at axially spaced locations along the enlarged central portion of the shaft 22 by means of an elongated key 32 which extends through all of the impellers. The axial spacing of the impellers along the shaft 22 is preferably uniform and is fixed by annular spacers 33. The entire assembly of impellers, key and spacers is fixed longitudinally on the shaft 22 by a pair of collars 34 and 35 which are connected by set screws to the shaft adjacent the bearings 26.

One form of impeller is illustrated in FIGURE 8 and comprises a generally cylindrical body having a front wall 41, a rear wall 42 and a recessed annular side wall 45. The front wall 41 has an annular lip 43 which defines a circular opening 44 in such wall. The opening 44 is substantially larger in diameter than the spacers 33 to provide an inlet to admit liquid into the interior of the impeller. The lip 43 preferably but not necessarily flares outwardly a short distance from the wall 41 as seen in FIGURE 8. The rear wall 42 comprises a circular disc provided with an opening to receive the drive shaft 22. The drive shaft opening is effectively sealed by the shaft and adjacent spacers to make the rear end of the impeller substantially fluid tight. The annular wall 45 is concentric with and slightly smaller in diameter than the end walls 41 and 42. The walls are bolted or otherwise connected into a unitary assembly. The wall 45 is relatively thick and is perforated by a plurality of staggered openings 46 extending radially therethrough.

Radially outside of and abutting the cylindrical wall 45 are a plurality of thin sheet metal rings 47 which are perforated and arcuate in cross section. The rings 47 are arranged in mutually abutting relationship with the convex surfaces of the rings disposed facing alternately toward and away from the inlet end of the impeller so that adjacent rings with abutting concave faces form a generally toroidal structure. A plurality of abutting toroidal structures are formed by the entire group of rings.

A second set of rings 48 is disposed radially inwardly of and abutting the cylindrical wall 46. The ring members 48 are also formed of perforated sheet metal and are similar in shape and arrangement to the rings 47 except that the rings 48 form abutting semi-toroidal structures with their radially inner ends open.

Radially inwardly of the rings 48 and surrounding the shaft 22 is an annular space which forms a liquid receiving chamber.

When the impeller is rotating and liquid is introduced into the chamber inside of the impeller, the liquid is projected by centrifugal action from the chamber through the perforations in the rings 48 and then into the openings 46 in the cylindrical walls 45 and then through the perforations in the rings 47 and is sprayed across the passageway 51 against the interior surface of the tube 11. The size of the perforations in the rings 47 and 48 and the size and depth of the openings 46 in the walls 45 should be such as to sufficiently retard the radially outwardly flow of liquid from the chamber within the impeller to the exterior of the impeller that such liquid will be spread around the entire periphery of the rotating impeller. This enables the liquid to be projected in a substantially uniform spray of droplets from the entire periphery of the impeller above the trough. While impellers as disclosed in my copending applications Serial Nos. 528,102 (now Patent No. 2,871,250) and 528,103, filed August 12, 1955, perform satisfactorily in small sized apparatus with relatively small flow rates, where such impellers are utilized in large apparatus with relatively large flow rates, the greatest density of spray exists near the bottom of the upwardly moving end of the impeller. However, even in high capacity devices, the impellers disclosed in this application enable the liquid to be uniformly distributed throughout the entire contact zone inside the upper portion of the tube 11. Although the type of impeller disclosed herein is preferred, various other types of impeller constructions may be employed. For example, the impellers disclosed in my copending application Serial No. 616,161 may be satisfactorily used under certain conditions.

Shaft 22 is mounted parallel to but below the axis of the tube 11 as shown in FIGURE 3. A large passageway 51, crescent shaped in cross section, is left along the upper portion of the tube above the eccentrically mounted impellers through which passageway the gases may pass in an essentially straight-through flow. Thus the passageway 51 provides an elongated straight gas-liquid contact zone. The ratio of cross sectional area of the passageway 51 to the cross sectional area of the tube may vary but should be sufficiently great that the pressure drop of the gas from one end of the tube to the other is inconsequential when the gases are passed through the contact zone at operating velocities in the absence of liquid.

The trough assembly 28 comprises a plurality of generally arcuate troughs 52 spaced along the lower periphery of the fractionating tube 11. The longitudinal spacing of the troughs 52 is equal to that of the impellers 31 in order that the lower portion of each impeller may be positioned in a corresponding trough. Each trough has a front wall 53 on the liquid inlet side thereof, a rear wall 54 and side walls 55 and 56. The dimensions of the troughs 52 and impellers 31 are such that each impeller is closely surrounded by the walls of its corresponding trough. The distance between the center lines of the shaft 22 and the tube 11 depends upon the diameter of the impellers 31 which when mounted on the shaft extend downwardly very close to the floors of the troughs 52 (e.g. about one-sixteenth inch). The major portion of the floor 57 of each trough is arcuate and concentric with the impeller (FIGURE 6). The center of curvature of the floor lies at the axis of the shaft 22. However, the curvature of the portion of the floor adjacent the side 55 of the trough where the rotating impeller emerges is such that the floor flares away from the impeller periphery as shown at 58 (FIGURE 6). This construction prevents the accumulation of excessive liquid at the periphery of the impeller where it emerges from the trough and results in a more uniform spray pattern.

Bolted to the trough assembly 28 at each end of the rear wall 54 of each trough 52 is a wing member 61 having an arcuate bottom corresponding to the inner surface of the tube 11. The wing members 61 together with the rear walls 54 of the troughs provide a plurality of transverse dams 60 (FIGURE 11) positioned across the lower portion of the tube 11 to divide the bottom of the tube into a plurality of liquid receiving chambers and to prevent the flow of liquid in each chamber past the adjacent dams where the depth of the liquid does not exceed the height of the dam. Alternatively, the wings 61 may be integral extensions of the rear walls 54. Further the wings may be mounted on a slide member, movable longitudinally with respect to tube 11, to allow convenient adjustment of their position relative to the troughs and guide members, to meet the requirements of any particular operation.

If desired, the wings forming the ends of the dams may be connected to the trough at any point along the sides thereof. Alternatively, the dams may be separate transverse partitions extending completely across the tube with no part of the partitions being formed by the trough structure.

An arcuate weir 62 is formed in the top of the wall 53 of each trough to provide an inlet for liquid into the impeller rotating in the trough. The weir 62 preferably has a radius equal to the radius of lip 43 of impeller 31 and is at the same level as such lip. Since the lip 43 is positioned very close to the front wall 53 of the corresponding trough 52, substantially all of the liquid passing over the weir 62 flows over the lip into the chamber within the impeller. It will be understood that one or more orifices could be provided in the wall 53 in lieu of the weir 62. Such orifices would preferably be arranged in an arcuate pattern of the same radius as the weir in order to accomplish the same result.

The trough assembly 28 is removably retained in the tube 11. The trough assembly is provided at the liquid inlet end with a pair of openings 135 (FIGURES 2a and 3) which receive a corresponding pair of positioning pins 136 fixed to the manifold 12. When the pins 136 are properly positioned in the openings 135, the trough assembly may be secured by bolt 137 (FIGURE 2b) which extends through the bottom wall of the tube 11. The entire shaft, impeller and trough assembly may be removed from the tube by removing the cover plate 15 from the manifold 13, loosening the bolt 137 and sliding out such assembly.

If desired, the troughs 52 may be constructed as individual units instead of being cast as a unitary assembly.

A plurality of split rings 63 form guide members to separate the upper periphery of the stripping or fractionating section of the tube 11 into a plurality of compartments. The guides 63 are longitudinally spaced along the tube 11 at the same intervals as the dams 60 and extend around the upper periphery of the tube 11 to points closely above the tops of the dams. The inside diameter of the guides 63 should not be so small as to obstruct to any substantial extent the flow of gases through the tube 11.

The principal functions of the guides are to confine the liquid, after it has been sprayed by each impeller and coalesces on the column wall, in a separate channel, thereby preventing mixing on the wall of liquid sprayed from separate compartments, and preventing channeling of liquid longitudinally through the apparatus, and to return the liquid at controlled locations as it flows down the wall and returns to the pools at the bottom of tube 11, thereby allowing the proportion of liquid returned to the same compartment for respraying to be controlled.

Each of the dams is normally situated intermediate the adjacent guide members 63 as shown in FIGURE 17 to split the downward flow of liquid returning from the contact zone and thus to determine the degree of recirculation as described more fully hereinafter. The positioning of the dams between the guide members is an important aspect of the invention and possesses utility in connection with various types of generally horizontal gas liquid contact devices. To provide for relative adjustability of the guides and dams, the entire assembly of guides is slidably mounted within the tube 11. The guides are rigidly connected into a unitary assembly by means of a pair of bars 64 which extend along the inner surface of the guides as best seen in FIGURES 4 and 6. A pair of keys 65 is attached to the outer surface of each guide 63 and the keys 65 are slidably mounted in a pair of keyways 66 in the opposing sides of the interior wall of the tube 11 (FIGURES 3 and 4). Thus the entire assembly of guides 63 is slidable as a unit longitudinally of the tube 11. The guide 63a at the liquid outlet end of the tube (FIGURE 4) is thicker than the remaining guides 63 for added strength. To the end guide 63a is connected a pair of reinforced keys 65a (FIGURES 4 and 6) upon each of which is mounted a pin 67 which extends radially inwardly into the tube 11 a short distance. The pins 67 are movable by a pair of oscillatable yokes 68 each of which is provided with an elongated slot 69 in which the pin 67 is snugly received in a sliding fit. The yokes 68 are rigidly connected on opposite sides of the tube 11 to an axle 71 which extends transversely across the interior of the tube and is journalled in the tube sides. One end of the axle 71 extends outside of the tube 11 through a fluid tight connection 72. The protruding end of the axle 71 is provided with a hand wheel 73 by which the axle may be rotated. The yokes 68 are correspondingly rotated to reciprocate the pins 67 and thus to move the assembly of guides 63 longitudinally in the tube 11.

It will be apparent that various equivalent arrangements for effecting relative longitudinal adjustment of the guides and the dams may be employed. For example, the guides may be rigidly fixed to the wall of the tube 11 and the entire shaft, impeller and trough assembly may be made longitudinally adjustable in the tube 11 as disclosed in my aforementioned copending application Serial No. 616,161. Further the guides, impellers and troughs may be fixed and the wing members 61 may be longitudinally adjustable.

The liquid to be treated flows through the tube from left to right as viewed in FIGURES 2a and 2b at a depth less than the height of the dams and greater than the height of the bottom of weir 62. The liquid in each chamber must pass through the weir 62 into the associated impeller 31 for projection upwardly across the gas-liquid contact zone. Intimate contact with the stream of stripping gas such as steam is obtained as the gas passes through the multiple curtains of droplets projected by the impellers. The liquid droplets strike the wall of the cylindrical tube 11, coalesce and flow downwardly along the walls between the guides 63 toward the pool of liquid at the bottom of the tube. The liquid descending between each adjacent pair of guides is divided by the associated dam 60. The liquid falling to the left of the dam as viewed in FIGURES 2a and 2b flows around the side walls 55 and 56 back to the front of the trough from which it was last projected. Thus all of this liquid must again be recirculated over the same weir 62 into the same impeller and again be projected upwardly by that impeller.

However, the descending liquid which falls to the right of the dam flows into the next downstream chamber for delivery into the trough and impeller in that chamber.

In the space between each dam and the inlet wall 53 of the succeeding trough, the liquid remains in a relatively non-turbulent state undisturbed by rotation of the impeller which is shielded by the trough. This isolation in quiet pools of the liquid before delivery into the impellers permits a smoother and better progression from stage to stage in the tube and results in more effective stripping or fractionation. In high capacity apparatus employing the impellers disclosed herein, the omission of the troughs would result in the impellers keeping the entire pool between the dams in a state of violent agitation and would cause much of the liquid in such pool to spill over the dams into the adjacent chambers, thus preventing any degree of accurate control of the progression of the liquid from stage to stage. On the other hand in this apparatus the liquid outside of the troughs remains in a relatively quiet state. This liquid is then delivered into the interior of the impeller and projected upwardly. Accordingly, the amount of liquid which progresses to the next succeeding stage is determined almost entirely by the relative position of the dams and guide members.

It will be understood that the amount of liquid recirculated through each stage may be varied by changing the relative axial position of the dams 69 and the guides 63. Where the guides are situated approximately midway between adjacent dams, approximately half of the liquid returning between a particular pair of guides is returned to the same stage from which it was last projected and the other half is delivered to the next succeeding downstream stage. As relative adjustment of the dams and guides results in a dam being moved toward the liquid outlet end of the space between the guides, more of the liquid will be returned to the same stage and less of the liquid will be returned to the next succeeding stage. Conversely, where the relative adjustment results in the dam being positioned nearer the liquid inlet end of the space between adjacent guides, more of the liquid will be delivered to the next succeeding stage and less of the liquid will be returned to the same stage. If conditions of operation are relatively standardized, it will be apparent that the relative position of the dams and guides may be fixed without provision for adjustment of either.

Figure 9:
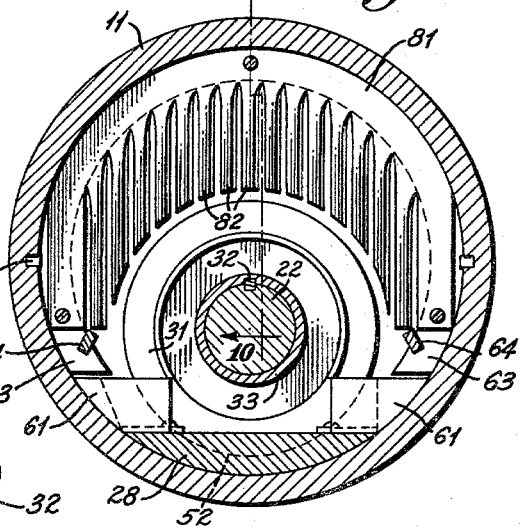
FIGURE 9 is a transverse vertical section of the fractionating tube showing a modified embodiment of the invention employing inflector members.
Figure 10:
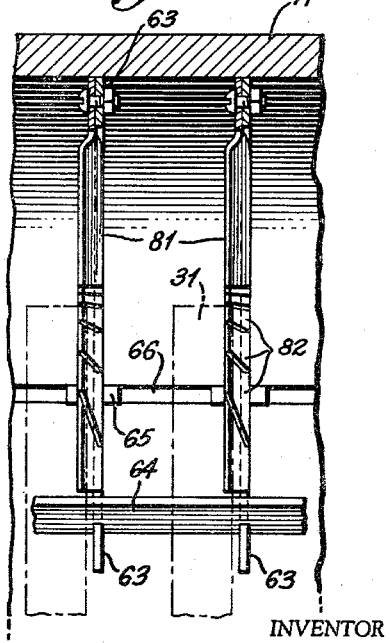
FIGURE 10 is a fragmentary longitudinal vertical section taken along the line 10—10 of FIGURE 9.

Under certain conditions of operation, particularly at high operating pressures, a marked improvement in fractionating effectiveness can be obtained by the use of inflector members in the passageway 51. One type of inflector which may be employed is illustrated in FIGURES 9 and 10. This inflector comprises a member 81 which is bolted to one of the guide members 63 and includes a plurality of vanes 82 which extend into the crescent shaped passageway 51. The vanes 82 may be inclined at any desired angle relative to the axis of the passageway 51 or alternatively may be disposed parallel to the axis of the passageway.

An alternative form of inflector is shown in FIGURE 11. This inflector comprises a member 83 which includes a solid central portion 84 which is bolted to the trough assembly 28. An opening is formed in the central portion 84 so that the inflector will not interfere with the rotation of the shaft 22. A plurality of generally radial vanes 85 extend outwardly from the central portion 84 into the passageway 51. These vanes may be inclined relative to the axis of the passageway at any desired angle or alternatively may be disposed parallel to the axis of the passageway. The vanes 85 terminate short of the rings 63 thus leaving an open space 86 between the outer periphery of the vanes and the inner edge of the guides 63.

A further modified form of inflector is shown in FIGURES 12 and 13 and comprises a pair of mesh discs 88 and 89 which are bolted to the trough assembly and separated a short distance by a spacer 91. Each of the members 88 and 89 is provided with a square mesh pattern formed by a plurality of crossing wire-like elements 92. The members 88 and 89 are so disposed relative to one another that the intersections of the elements 92 of one of the members is axially aligned with the centers of the mesh openings of the other of the members.

Figure 14:
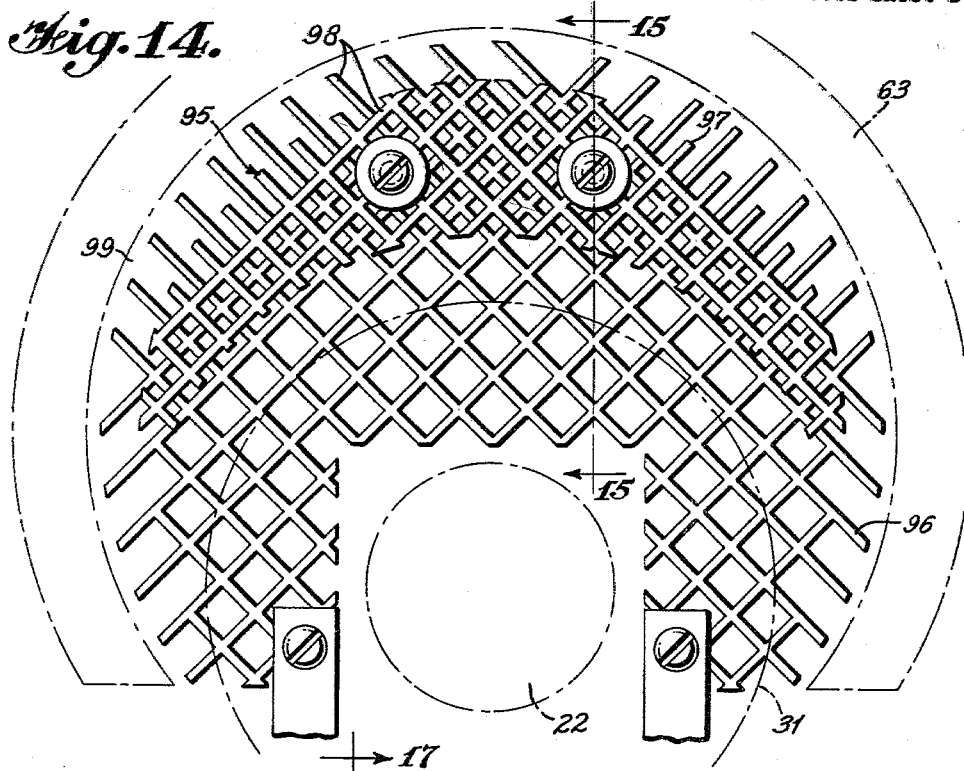
FIGURE 14 is an elevational view of still another modified form of inflector.

A variation of the inflector shown in FIGURES 12 and 13 is disclosed in FIGURE 14 at 95. The inflector 95 also comprises a pair of mesh members. A mesh disc 96 is bolted to the trough assembly. A second crescent shaped mesh member 97 is bolted to the disc 96 in face to face abutting relationship. The crescent shaped member 97 is disposed in approximately the center of the crescent shaped passageway 51. The members 96 and 97 like the members 88 and 89 are composed of a plurality of wire-like elements 98 which cross to form a square mesh pattern. The mesh patterns of the members 96 and 97 are staggered relative to one another in the same manner as the mesh patterns of the members 88 and 89 are staggered. As best seen in FIGURE 14 some of the elements 98 are omitted near the outer periphery of both of the members 96 and 97. The outer periphery of the inflector 95 terminates short of the guide 63 to leave a space 99 therebetween.

The construction of the inflector 95 results in the greatest inflection action taking place in the center of the passageway 51 with relatively less inflection action in the areas at the edges of the passageway adjacent the impellers 31 and the guide members 63.

Figure 16:
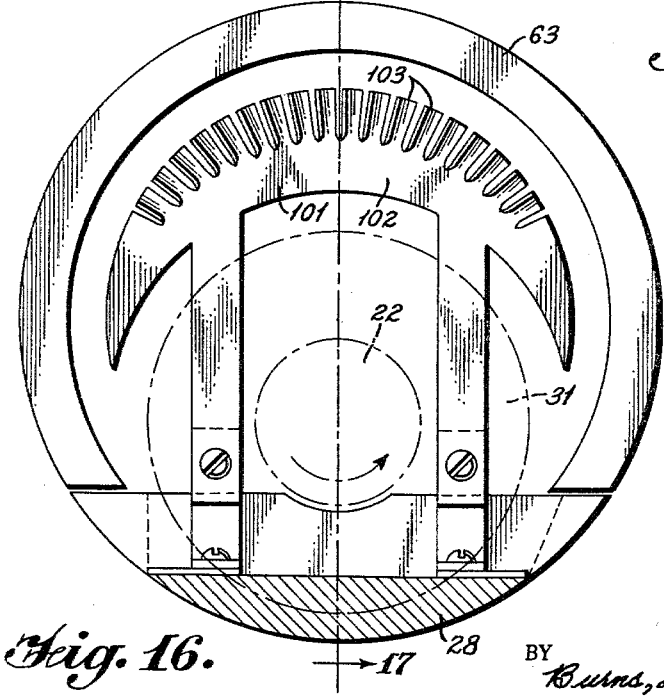
FIGURE 16 is an elevation of yet another form of inflector.
Figure 15:
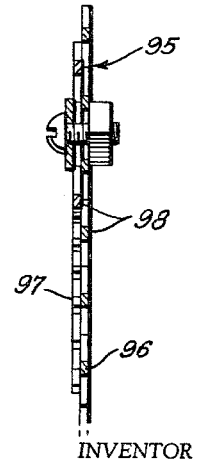
FIGURE 15 is a fragmentary vertical section taken along the line 15—15 of FIGURE 14.

A still further alternative form of inflector is illustrated in FIGURES 16 and 17. This inflector 101 is also bolted to the trough assembly and includes a crescent shaped member 102 which is situated approximately in the center of the crescent shape passageway 51, thus leaving openings between the bottom of the inflector and the impellers 31 and between the top of the inflector and the guides 63. The outer edge of the member 102 is slotted to form a plurality of vanes 103 which may be situated at any desired angle relative to the axis of the passageway 51.

The apparatus may be operated entirely without inflectors and excellent results may be obtained. However, in many operations improved results are obtained by mounting the inflectors in the gas-liquid contact zone. In general the inflectors show the greatest improvement in effectiveness as the operating pressure is increased. The availability of the inflectors thereby extends the flexibilty of the apparatus. Further flexibility may be obtained by using different numbers of inflectors. One inflector may be placed in each stage of the tube 11, i.e. one inflector for each impeller. Alternatively, the number of inflectors may be less than the number of stages.

Several explanations may be advanced for the improvement which results when inflectors are employed. Such improvements may be due to:

(1) An increase in the area of metal surface wetted by the liquid causing an increase in the area of interfacial contact between the liquid and vapor;

(2) Reduction of the amount of liquid entrained with vapor and carried upstream through the tube;

(3) Increased turbulence in the vapor phase causing: (a) increased rate of mass transfer from the liquid-vapor interface into the body of the vapor and (b) change of the velocity profile of the stream of vapor through the column to give a more uniform velocity of vapor flow over the cross section of the tube;

(4) Prevention or minimizing of back mixing that might be caused by: (a) non-uniform flow of the vapor or (b) diffusion in the vapor phase.

The improvement due to 1 and 2 above is relatively minor. In relation to the quantity of surface which is produced in the spray, the extra surface area produced by the inflectors is very small. Moreover, entrainment is not a serious problem in this method and apparatus because the droplet sizes are such as to minimize entrainment.

It is believed that by far the greatest improvement resulting from the use of inflectors is attained because of the effect delineated in number 3 above. In spite of the curtains of droplets in the gas-liquid contact zone, it is believed that the vapors tend to persist in a streamline type of flow rather than going into turbulent flow. It is known that when vapors are flowing in streamline flow in a simple conduit such as a circular pipe, the velocity of the vapor in the center of the conduit is twice as great as the average velocity of the vapor over the whole cross section of the conduit. This means that the vapor at the center is traveling much faster than the vapor near the wall. On the other hand when the vapors are in typical turbulent flow, the velocity is nearly the same at any point across the conduit except for a very small space near the wall. More effective fractionation is obtained in the apparatus of this invention where a uniform velocity profile is obtained. The use of inflectors tends to create more turbulence thus rendering the flow profile more uniform and preventing channelling of vapors through the center of the crescent shaped passageway 51. For this reason it is desirable that the greatest inflection action occur near the center of the cresent shaped area and that little or no inflection occur near the edges of the passageway.

Another important effect of the inflectors is the increased rate of mass transfer within the vapors. It is known that except at very low pressures the rate of mass transfer obtainable by the process called "eddy diffusion" is much greater than that produced by ordinary "molecular diffusion." Accordingly, it is believed that the inflectors produce a large number of little whirlpools, eddies or vortexes in the vapors on the back side of each of the inflectors and that the eddying vapors as they pass through the sprays of liquid carry away the molecules vaporizing from the liquid droplets into the body of the vapor much more effectively than the vapors do if they are not in this eddying condition.

It is to be understood that the function of the inflectors is to increase turbulence and prevent channeling and not to cause the vapors to flow in a back and forth tortuous path. The inflectors do not prevent the vapor from following an essentially straight-through flow path in the passageway 51. Accordingly, the pressure drop through the vapor-liquid contacting zone caused by the inflectors is not unduly great.

FIGURE 1 discloses the apparatus of the invention employed as a batch fractionator for test distillations with total reflux. In this arrangement, the regular vapor inlet 10 is sealed off and a reboiler 111 is connected to the liquid outlet 30. The reboiler is heated by a burner 112. The liquid material to be treated is placed in the reboiler and heated to the boiling point with the vapors passing upwardly through the conduit 30 into the tube 11. The composition of the material in the reboiler 111 may be determined by drawing off a sample through the outlet line 113 and valve 114. A manometer 115 is connected across the ends of the tube 11 through the openings 116 (FIGURE 2a) and 117 (FIGURE 2b). Thus the pressure drop across the tube may be measured.

The vapors, after passing through the tube 11, emerge through the vapor outlet 40 and into a conduit 118 to a condenser 119. The temperature in the vapor outlet line 40 may be determined by means of thermometer 128. The condenser 119 is water cooled with the cooling water flowing into the condenser through the inlet 121 and out through the outlet 122. Also connected to the condenser is a vacuum line 123. The condensed liquid passes outwardly from the condenser through conduit 124 into a flow meter 125, from which the liquid is returned to the tube 11 through the conduit 21. A sample of the liquid in the conduit 21 may be drawn off through the outlet line 126 and valve 127.

It will be understood that the batch system of FIGURE 1 may be employed either for test purposes or for commercial operation. In most commercial operations, however, the system would be continuous with fresh feed being constantly supplied and treated products being constantly withdrawn with perhaps an appropriate amount of reflux.

In a stripping operation, the material to be processed enters the column at an appropriate point. It is picked up preferably two or more times and sprayed by the impeller in the first trough below the inlet point, then flows to the next trough where this spraying action is repeated. On reaching the lower end of the column, the processed liquid flows through outlet tube 30 for disposition.

Steam or other vapor for the stripping process enters the column through the tube 10 in the manifold 13 and travels through the column counter to the general flow of the liquid material being processed, but transverse the flow of impelled droplets. While passing through the column, the steam comes in repeated contact with the sprays of liquid droplets produced by the action of the impellers, as well as with the coalesced liquid covering the walls, the impeller and the inflectors if used. By far the greatest effect results from the contact with the sprays. After each contact, the liquid is returned to non-turbulent pools before being projected upwardly once more. This intimate contact between the steam and extensive liquid surfaces, particularly as provided by the droplets, which surfaces are constantly being renewed, together with the countercurrent flow of the liquid and vapor streams and the alternate resting in non-turbulent pools, results in an exceedingly efficient stripping action. It has been found that the material to be distilled is in substantial equilibrium between the liquid and vapor phases at all times despite the high linear velocity of vapor flow which may be employed. While countercurrent operation is preferred, it is possible to provide for concurrent flow of the gas and liquid. Depending upon the material being treated and other factors, the operation may be performed at varying pressures above and below atmospheric.

Openings 116 and 117 in the manifolds 12 and 13 respectively provide a means by which instruments for the measurement of the absolute pressure as well as the pressure drop through the column may be attached. The pressure drop obtained in this apparatus is low compared to the pressure drop in most heretofore known devices. The low pressure drop is made possible by the fact that a large passage is provided for the straight-through flow of stripping vapors between the outer periphery of the impellers and the inner periphery of the guide members above the normal level of liquid in the pools.

The number of impellers, dams, troughs and guides in the column will generally depend on the available space. In general, it is desirable to extend these elements along as much as possible of the central section of the column.

The gases or vapors are recovered in a conventional manner. If the vapors are homogeneous, as is the case when ordinary distillation is carried out, they may be condensed and recovered in the usual way. If, as is often the case when stripping vapors are employed, the condensate forms a two-phase system, the material stripped from the liquid being treated may be recovered by decantation or by dissolving or extracting them with a suitable solvent or by other conventional methods where the material is of sufficient value to warrant recovery.

The number of stages in the vapor-contacting section will vary considerably, depending upon the material undergoing treatment and the degree and precision of separation desired. For the removal of components comprising a fraction of one percent of the total liquid treated, as often occurs when refining oils and fats, the minimum number of stages is about ten and is preferably thirty or above.

The droplet sizes in general depend upon the particular design and speed of rotation of the impeller employed. Increased speed of rotation of impellers of a given style and size increases the fineness of the spray; very fine spray is not necessary nor desirable. A characteristic of the spray produced in this apparatus is that the droplet sizes for any particular operating condition are relatively uniform, as compared with the size distribution in sprays produced by other means such as high-pressure spray nozzles. Further, the size of droplets is such as not to be entrained in the gas at the operating velocity to any material degree. The droplet sizes (diameter) in the preferred range of operating conditions will be mainly within the range from 0.1 to 2 mm.

The desired droplet size can be obtained when using impellers of a particlular size and design by operating the impellers at an appropriate speed of rotation. Impellers of different diameters produce approximately equivalent sprays when operated respectively at the same peripheral velocity. The preferred range of speeds of rotation is such that the values of peripheral velocity, in feet per second, lie in the range between 18 and 50. Below this range, the spray is not sufficiently energetic and uniform to make a good pattern across the whole vapor space; above this range the spray impinges too violently on the wall, with a resulting tendency to production of fine lateral spray and entrainment with the stream of vapor. Power consumption becomes unnecessarily high above the preferred range. Especially preferred is the range between 25 and 40.

The column is usually operated in a horizontal position. In some instances, however, it may be desirable to tilt the column at no more than a small angle, say up to about 10° from the horizontal, to assist the stage-to-stage progression of the liquid. Moreover, the column may be effectively operated with a slight backward tilt because the liquid is, in effect, pumped from stage to stage.

The linear vapor velocities employed may be varied over a wide range from relatively low velocities below two feet per second to relatively high velocities of thirty feet per second or more. The maximum is something short of the point where entrainment of liquid becomes excessive The optimum vapor velocity will depend upon the job to be done, the pressure conditions, the size of droplets, the slope of the apparatus, the rate of liquid feed, the vapor density and the like. For example, linear velocities can be considerably higher at one mm. pressure than at atmospheric.

The apparatus employed has a very small H.E.T.P. (height equivalent to one theoretical plate). The number of theoretical plates to be employed for any given service is dependent upon a number of factors, including the nature of the material undergoing treatment, the amount of material to be distilled from the feed stock, and the degree of precision of separation required, as well as the presence or absence of a stripping vapor. In general, when removing fatty acids and odoriferous materials from fats and oils wherein the material to be removed amounts to less than about one percent by weight of the feed, about six to fifteen theoretical plates are sufficient when using steam as the stripping agent. A larger number of theoretical plates provides improved steam utilization and a better margin of safety as to quality of product. When operating with as many as thirty theoretical plates, the efficiency of removal of fatty acids from the oil and of steam utilization is still further increased, exceeding 95% and approaching 100%.

When using the device as a fractional distillation device, the number of theoretical plates employed will depend upon the material being fractionated and the degree of fractionation required. Obviously, the number of theoretical plates can be increased still further by lengthening the vapor-contact section and adding more guides, troughs and impellers. It will be understood that about the same effectiveness can be obtained in a number of ways, such as employing no inflectors or varying the number of inflectors, the number of stages per unit length, the number of successive spray cycles in each stage, and the speed of the rotor.

It should be noted that when the material being treated has, say, less than one percent of distillate material present, the residence time and therefore the number of times at which the oil is sprayed from any given compartment is substantially the same from the first to the last compartment. Thus, if the rate of feed is one pound per minute and the spraying capacity per compartment is two pounds per minute, the oil will be sprayed from each compartment approximately two times before it flows to the next compartment.

Depicted in FIGURES 20 and 21 is a modified form of apparatus according to the invention. Specifically, this form of apparatus incorporates a somewhat different arrangement of the guide members, dams and troughs.

Guide members 150 and dams 151 in the device of FIGURES 20 and 21 are situated in vertical alignment with each other. Thus the guide members and dams may be integrally formed in one piece as shown in FIGURE 20. Alternatively, they may be separate members welded together or left unconnected. Troughs 152 enclose the lower portion of the impellers 31. The trough 152 may have the same structure as the troughs 52 except that the former are not connected to the dams 151 but are spaced intermediate such dams. Thus the dams 151 extend completely across the lower portion of the tube 11 leaving a passageway 153 between the rear of each of the troughs and the next downstream dam and a passageway 154 between the front of each of the troughs and the next upstream dam. These passageways extend across the chambers in the bottom of the tube 11 between the dams 151.

Each of the dams 151 has a centrally disposed opening which preferably is a weir 155. Thus whereas the dams in the embodiment of FIGURES 1–7 prevent axial flow of liquid from chamber to chamber along the bottom of the tube, the dams 151 permit such flow through the weirs 155. Liquid which flows through any of the weirs 155 travels axially along the downstream chamber and through a weir 156 in the next succeeding trough 152. The weir 156 is similar to the weir 62 of the troughs 52.

Liquid flowing through the weir 156 is projected upwardly by the impeller 31 across the passageway 157 in the upper portion of the tube in the same manner as previously described in connection with the embodiment of FIGURES 1–7. The projected liquid coalesces on the walls of the tube 11 between the guide members 150 and flows downwardly in the same manner as previously described. It can be seen with reference to FIGURE 21 that the returning coalesced liquid moves downwardly toward the same chamber from which it was last projected. The returning liquid is then divided by the lateral ends of the troughs 152. That portion which falls upstream of the troughs flows through the passageway 154 back to the weir 156 and is again projected by the same impeller. A second portion of the liquid which passes downstream of the trough 152 moves through the passageway 153 and across the weir 155 into the next succeeding chamber where it flows into the next succeeding impeller.

The liquid flowing across each of the weirs 155 is forced to move directly into the adjoining downstream trough 152. It cannot flow laterally outwardly through the passageways 154 because it would be required to move against the stream of returning coalesced liquid which flows inwardly through the passageways 154. Thus channeling of the liquid around the impellers is effectively precluded and all of the liquid entering any particular chamber necessarily passes through the impeller.

By varying the position of the trough 152 with respect to the dams 151 the relative amounts of returning liquid which are recycled to the same impeller and passed downstream to the next impeller respectively may be controlled. Such adjustment can be effected by making all of the divider members 150 and dams 151 slidable longitudinally as a unit in the column. Alternatively the shaft, impellers and troughs may be movable longitudinally. Preferably the dams and troughs are adjusted so that the passageways 153 are narrower than the passageways 154.

Relative adjustability of the dams and troughs is not essential and if employed need not be absolutely precise because the embodiment of FIGURES 20 and 21 has a tendency to equalize the liquid level in all chambers and thus is somewhat self-adjusting. Where there is a particular high liquid level in any given chamber, a greater proportion of the coalesced liquid returning to such chamber is directed downstream to the next succeeding chamber.

The weir 155 in the dam 151 which is downstream of the last impeller in the tube 11 functions as a control weir to regulate the level of liquid throughout the tube. Desirably the last weir 155 is adjustable in height. For example, a plate may be slidably mounted across the back of the last dam 151 to move horizontally upwardly across the bottom of the weir 155 and close the lower portion of the weir to any desired level. Alternatively, a separate adjustable control weir may be placed further downstream from the last impeller.

Figure 20:
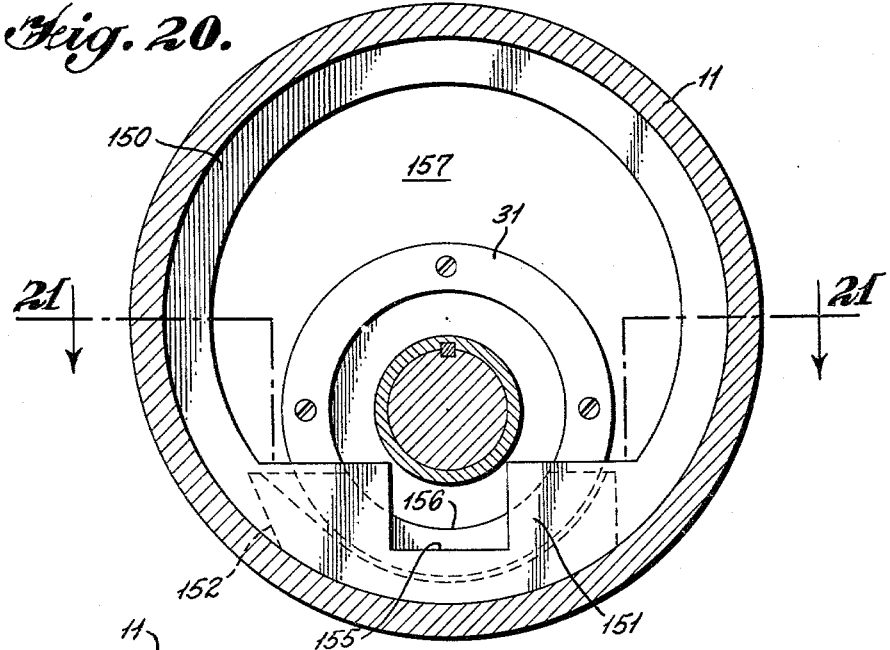
FIGURE 20 is a vertical cross section of a modified embodiment of the invention.
Figure 21:
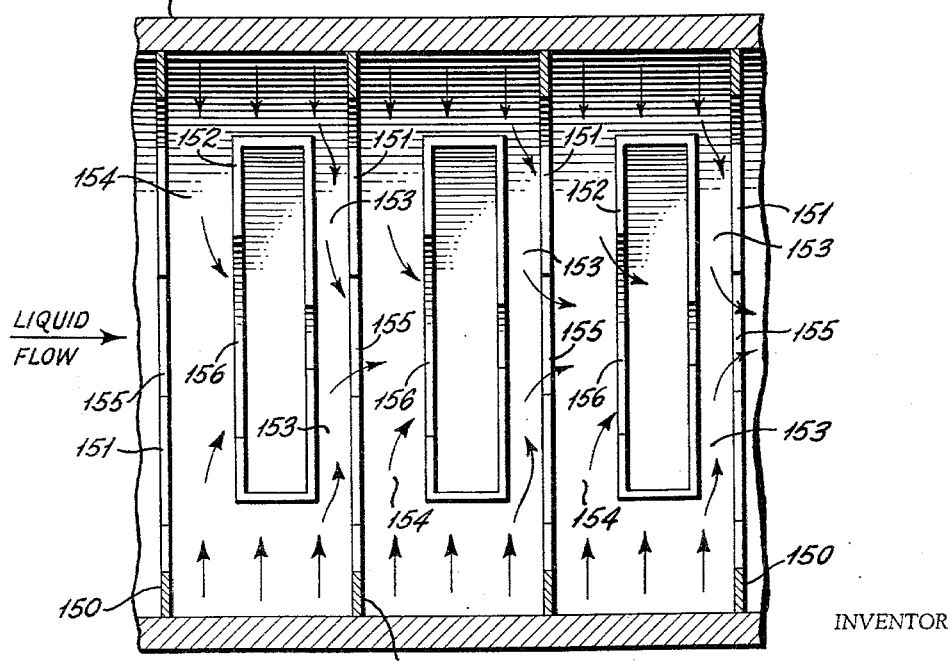
FIGURE 21 is a horizontal section taken along the line 21—21 of FIGURE 20.

In other respects, the embodiment shown in FIGURES 20 and 21 is like the device of FIGURES 1–7 in structure and operation. It will be understood that a variety of different impellers, inflectors and other alternative components may be employed with the device of FIGURES 20 and 21 in the same manner as discussed in connection with the device of FIGURES 1–7.

The advantages of the method and apparatus according to the invention may be briefly summarized as follows:

(1) Low pressure drop through the column;

(2) Effective mixing of a large volume of liquid and renewal of liquid surfaces in contact with the vapor through more uniform spraying action, repeated sufficiently to result in high effectiveness per unit length of columns (small H.E.T.P.);

(3) Lowered capital and operating costs;

(4) Ease of disassembly for cleaning and repair;

(5) Good control of temperature;

(6) Good heat transfer;

(7) Hold up in the column may be varied down to small values allowing use of short time and high temperature for processing materials otherwise difficult to distill or refine without overheating;

(8) Flexibility making the apparatus adaptable to a wide variety of materials and feed rates by varying the relative positions of the guides and dams, the angle of tilt, the speed of rotation of the impellers, and the number of inflectors used, if any;

(9) Close approach to ideal countercurrent performance in stripping operations;

(10) Permits use of larger, higher capacity apparatus without decrease in efficiency;

(11) Permits lower speed of rotation, thus decreasing power consumption.

In a preferred practice of the invention in the treatment of fat, the fat is preliminarily treated in conventional manner to effect deaeration and is thereafter heated to desired processing temperature, normally a temperature of about 150° C. to about 300° C., and preferably a temperature of about 200° C. to about 270° C. The fat temperature which is employed is conventional in the fat refining art and does not per se constitute a novel aspect of the invention. The so-prepared hot fat is then treated in an apparatus such as described heretofore.

The fat refining process of this invention can be practiced at any desired pressure including atmospheric pressure, but is preferably practiced at a pressure of below about 25 mm. of mercury. A preferred pressure range is from about 25 to about 0.5 mm. of mercury. It will be appreciated that the combined volume of stripping vapor and volatile materials stripped from the fat will be greater at lower pressures than at higher pressures, hence, the stripping effect per unit weight of stripping media is greater at lower absolute pressures, for the type of materials being discussed. When different materials are treated, different pressures may be employed as found expedient.

Steam is preferred as the stripping vapor although other vapors or gases which exert no harmful effect on the fat can be used. These include lower boiling alcohols, low-boiling hydrocarbons such as hexane and the like.

EXAMPLES

A series of test were performed in the system disclosed in FIGURE 1 which demonstrate the effectiveness of the apparatus of the invention both with and without inflectors. The tests were performed using an octane-ethylbenzene mixture as the liquid being treated.

The tests were performed in a tube having a diameter of 5 inches and a working length of 34½ inches with 31 stages, that is 31 impellers and troughs.

The tube was tilted at an angle of 0.5° toward the liquid outlet end. Since the dams were positioned between the guide members to control stage to stage progression of the liquid, it is believed that the tilt had little or no effect except for draining the apparatus when it was shut down.

Table I shows the results of the tests of the apparatus without inflectors and Table II shows the comparison of the effectiveness of the apparatus with various types of inflectors and with no inflectors.

Table I [1]

| Example No. | Impeller Velocity [2] | Sprayings Per Stage | Rate of Vapor Throughout | | Fractionating Effect [5] | Pressure Drop [6] |
|---|---|---|---|---|---|---|
| | | | Linear Velocity [3] | Mass Velocity [4] | | |
| 1 | 1,150 | 1.44 | 3.07 | 193 | 2.7 | .044 |
| 2 | 1,150 | 3.1 | 3.08 | 194 | 3.2 | .047 |
| 3 | 1,150 | 3.1 | 3.15 | 188 | 3.3 | .045 |
| 4 | 1,150 | 3.1 | 4.13 | 259 | 3.1 | .074 |
| 5 | 1,150 | 8.5 | 3.21 | 193 | 3.9 | .049 |
| 6 | 1,150 | 17.0 | 2.07 | 125 | 4.3 | .019 |
| 7 | 2,050 | 3.1 | 3.09 | 187 | 3.3 | .036 |
| 8 | 2,050 | 5.7 | 4.00 | 243 | 3.6 | .064 |
| 9 | 2,050 | 8.5 | 3.24 | 198 | 4.0 | .038 |
| 10 | 2,050 | 8.5 | 4.00 | 243 | 4.0 | .078 |
| 11 | 2,050 | 11.3 | 3.34 | 203 | 4.3 | .044 |
| 12 | 2,050 | 17.0 | 3.04 | 185 | 4.4 | .043 |

[1] Operating pressure—approximately 50 millimeters of mercury.
[2] Revolutions per minute.
[3] Feet per second.
[4] Pounds per hour per square foot of tube.
[5] Number of theoretical plates.
[6] Millimeters of mercury per theoretical plate.

Table II [1]

| Example No. | Style of Inflector | Rate of Vapor Throughout | | Fractionating Effect [11] | Pressure Drop [12] |
|---|---|---|---|---|---|
| | | Linear Velocity [9] | Mass Velocity [10] | | |
| 7 | none | 3.09 | 187 | 3.3 | 0.037 |
| 13 | [2] 9a | 2.79 | 172 | 6.7 | 0.21 |
| 14 | 9a | 4.05 | 252 | 6.2 | 0.34 |
| 15 | 9a | 4.19 | 265 | 6.0 | 0.41 |
| 16 | [3] 9b | 3.00 | 180 | 4.8 | 0.065 |
| 17 | 9b | 4.03 | 241 | 4.5 | 0.14 |
| 18 | [4] 11a | 2.80 | 169 | 6.8 | 0.091 |
| 19 | 11a | 3.83 | 226 | 6.7 | 0.17 |
| 20 | [5] 11b | 1.21 | 72 | 8.7 | 0.026 |
| 21 | 11b | 2.96 | 177 | 7.2 | 0.20 |
| 22 | 11b | 4.22 | 253 | 6.8 | 0.42 |
| 23 | [6] 12 | 2.77 | 170 | 6.7 | 0.11 |
| 24 | 12 | 4.55 | 269 | 6.1 | 0.27 |
| 25 | 12 | 4.95 | 296 | 6.1 | 0.25 |
| 26 | [7] 14 | 2.13 | 126 | 6.6 | 0.045 |
| 27 | 14 | 3.09 | 184 | 6.3 | 0.082 |
| 28 | 14 | 4.92 | 292 | 6.0 | 0.21 |
| 29 | [8] 16 | 1.36 | 81 | 7.7 | 0.014 |
| 30 | 16 | 2.62 | 156 | 6.7 | 0.072 |
| 31 | 16 | 4.06 | 241 | 6.4 | 0.19 |

[1] Impeller speed—2050 r.p.m.; operating pressure—approximately 50 millimeters of mercury; number of sprayings per stage—3.1.
[2] Figure 9 inflector; vanes 45° to tube axis.
[3] Figure 9 inflector; vanes 0° to tube axis.
[4] Figure 11 inflector; vanes 45° to tube axis.
[5] Figure 11 inflector; vanes 60° to tube axis.
[6] Figure 12 inflector.
[7] Figure 14 inflector.
[8] Figure 16 inflector; vanes 45° to tube axis.
[9] Feet per second.
[10] Pounds per hour per square foot of tube.
[11] Number of theoretical plates.
[12] Millimeters of mercury per theoretical plate.

All of the velocities given in Tables I and II were determined based upon the total cross sectional area of the tube rather than the passageway 51. Accordingly, the listed velocities are smaller than the actual velocities but suffice for comparative purposes. It can be seen that separating efficiency decreased as the velocity increased.

Figure 19:
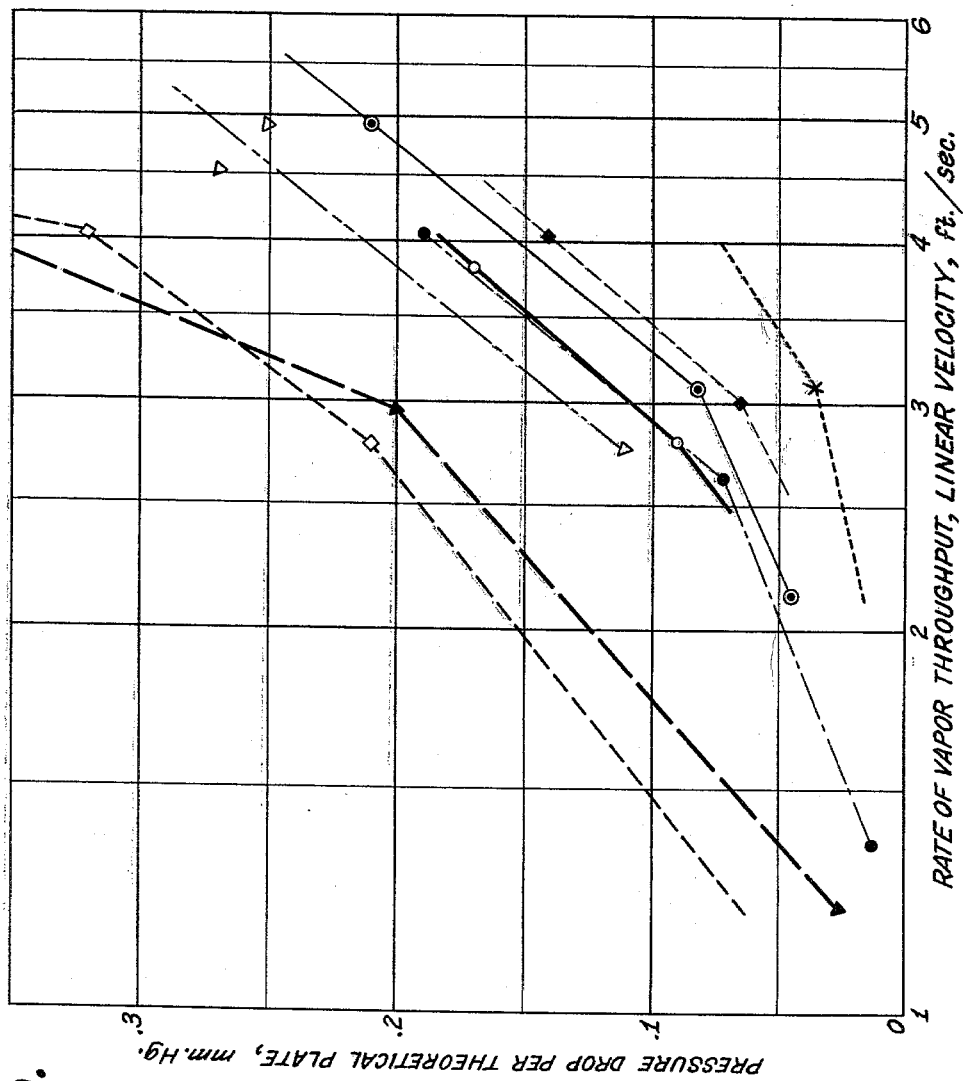

FIGURES 18 and 19 graphically portray the data recorded in Table II.

Although excellent results were obtained without inflectors, it is apparent from Table II and from the graphs depicted in FIGURE 18, that under the test conditions, the fractionating effect of the apparatus with inflectors was increased to a marked degree over the fractionating effect without inflectors. It is true that as shown in FIGURE 19, the pressure drop through the apparatus is increased when the inflectors are employed. Nevertheless, the increase in pressure drop is not substantial and is more than offset by the increase in fractionating effectiveness.

There has been illustrated and described what is considered to be the preferred embodiments of the invention. It will be understood, however, that various modifications may be made by persons skilled in the art without departing from the broader scope of the invention as set forth in the appended claims.

This application is a continuation in part of my prior application Serial No. 788,432, filed January 22, 1959, now abandoned, which is a continuation in part of my prior application Serial No. 616,161, filed October 16, 1956, now abandoned, which in turn is a continuation in part of my prior applications Serial No. 528,102, filed August 12, 1955, now Patent No. 2,871,250, and Serial No. 528,103, filed August 12, 1955, now abandoned.

Having thus described my invention, I claim:

1. An apparatus for contacting a gas and a liquid comprising a generally horizontal elongated vessel having a gas inlet and outlet at opposite ends of said vessel and a liquid inlet and outlet at opposite ends of said vessel, said vessel having a gas passageway in the upper portion thereof extending between said gas inlet and outlet, a plurality of transverse dams mounted at spaced locations in said vessel between said liquid inlet and outlet to divide the lower portion of said vessel into a plurality of liquid receiving chambers, spray means positioned in said chambers to remove a large volume of liquid from each of said chambers to maintain the liquid level in said chambers below the tops of said dams and to project said removed liquid as a plurality of spaced curtains of droplets upwardly across said passageway for intimate contact with gas passing through said passageway so that said droplets impinge against and coalesce on an inner surface of said vessel, and a plurality of transverse guide members mounted in said vessel at axially spaced locations, said droplets having a size and velocity as to be substantially non-entrained by the gas in said passageway, said members extending continuously around the upper portion of said vessel above said dams and projecting inwardly a short distance from said surface into said passageway to divide the upper portion of said vessel into a plurality of separate channels in which the coalesced liquid descends in flow paths, each of said channels being positioned in the path of one of said spray means to receive substantially all of the liquid projected by said one spray means to prevent substantial intermixing on said surface of liquid sprayed from separate chambers, each chamber having the top of its downstream dam spaced between the edges of the flow path in the channel which receives liquid sprayed from that chamber to return a portion of the liquid to the same chamber and direct another portion thereof to the next downstream chamber.

2. An apparatus as recited in claim 1, having in addition means for adjusting the relative position of said dams and guide members longitudinally of said vessel.

3. An apparatus as recited in claim 1 wherein said spray means comprises a plurality of impellers mounted at axially spaced intervals in said vessel and extending into said chambers, each of said impellers being hollow to define a liquid receiving space and including an inlet to said space and restricted outlet means disposed annularly outside of said space to retard the outward flow of liquid from said space so that said liquid is projected substantially uniformly from the entire periphery of said impellers above the liquid in said chambers, means to rotate said impellers, and means enclosing the lower portions of said impellers to admit liquid from said chambers only through said impeller inlets.

4. An apparatus for contacting a gas and a liquid comprising a generally horizontal elongated vessel having a gas passageway extending longitudinally through the upper portion of said vessel, a gas inlet and outlet at opposite ends of said vessel and a liquid inlet and outlet at opposite ends of said vessel; a plurality of transverse dams dividing the lower portion of said vessel between said liquid inlet and outlet into a plurality of liquid receiving chambers; means mounted in said vessel to project liquid from each of said chambers in a path extending across said passageway to the inner surface of said vessel above said chambers as a plurality of curtains of droplets for intimate contact with gas flowing through said passageway, said droplets having a size and velocity as to be substantially non-entrained by the gas in said passageway, said projected liquid coalescing on said inner surface, said projecting means including a drive shaft rotatably mounted in said vessel and a plurality of impellers mounted at axially spaced intervals on said shaft and extending into each of said chambers, each of said impellers being hollow to define a liquid receiving space and including an inlet to said space and outlet means disposed annularly outside of said space; a plurality of upright guide members mounted at axially spaced intervals on said inner surface between said gas inlet and outlet above said impellers, said members extending across the top and down a major portion of the sides of said vessel above said dams and projecting inwardly a short distance from said surface to form channels between said members to limit movement on said surface axially of said vessel of substantially all of said coalesced liquid to the width of one of said channels and to direct said coalesced liquid in downward flow paths in said channels; each one of said dams having its top spaced between the edges of the flow path in one of said channels which is positioned in the path of liquid projected from the impeller immediately upstream of said one dam so that different portions of the liquid projected from each chamber are returned to the same chamber and to the next downstream chamber respectively on opposite sides of the dam therebetween; and a plurality of troughs positioned in said chambers to extend above the surface of the liquid in said chambers and closely surrounding the lower portions of said impellers, each of said troughs having an inlet in communication with its associated chamber below the tops of the adjacent dams to direct the flow of liquid from said chamber into the associated impeller through the inlet to said space thereby substantially preventing overflow of liquid across the dams and causing the liquid in each of the chambers to be projected by the impellers before passing to the next downstream chamber.

5. An apparatus for contacting a gas and a liquid comprising a generally horizontal elongated vessel having a gas passageway extending longitudinally through the upper portion of said vessel, a gas inlet and outlet at opposite ends of said vessel and a liquid inlet and outlet at opposite ends of said vessel; a plurality of transverse dams dividing the lower portion of said vessel between said liquid inlet and outlet into a plurality of liquid receiving chambers; means mounted in said vessel to project liquid from each of said chambers in a path extending across said passageway to the inner surface of said vessel above said chamber as a plurality of curtains of droplets for intimate contact with gas flowing through said passageway, said droplets having a size and velocity as to be substantially non-entrained by the gas in said passageway, said projected liquid coalescing on said inner surface, said projecting means including a drive shaft rotatably mounted in said vessel and a plurality of impellers mounted at axially spaced intervals on said shaft and extending into each of said chambers, each of said impellers being hollow to define a liquid receiving space and including an inlet to said space and restricted outlet means disposed annularly outside of said space to retard the flow of liquid from said space through said outlet means so that the liquid is projected substantially uniformly from the entire periphery of the impeller above the surface of the liquid in said chambers; a plurality of upright guide members mounted at axially spaced intervals on said inner surface between said gas inlet and outlet above said impellers, said members extending across the top and down a major portion of the sides of said vessel above said dams and projecting inwardly a short distance from said surface to form channels between said members to limit movement on said surface axially of said vessel of substantially all of said coalesced liquid to the width of one of said channels and to direct said coalesced liquid in downward flow paths in said channels; each one of said dams having its top spaced between the edges of the flow path in one of said channels which is positioned in the path of liquid projected from the impeller immediately upstream of said one dam so that different portions of the liquid projected from each chamber are returned to the same chamber and to the next downstream chamber respectively on opposite sides of the dam therebetween; and a plurality of troughs positioned in said chambers to extend above the surface of the liquid in said chambers and closely surrounding the lower portions of said impellers, each of said troughs having an inlet in communication with its associated chamber below the tops of the adjacent dams to direct the flow of liquid from said chamber into the associated impeller through the inlet to said space thereby preventing overflow of liquid across the dams and causing the liquid in each of the chambers to be projected by the impellers before passing to the next downstream chamber.

6. An apparatus as recited in claim 5 wherein said trough inlets comprise weirs formed in one wall of said troughs, the configuration of said weirs corresponding to that of said impeller inlets and wherein means are provided to adjust the relative positions of said dams and guide members longitudinally of said vessel.

7. An apparatus for contacting a gas and a liquid comprising a generally horizontal elongated vessel having a gas passageway extending longitudinally through the upper portion of said vessel, a gas inlet and outlet at opposite ends of said vessel and a liquid inlet and outlet at opposite ends of said vessel; a plurality of transverse dams dividing the lower portion of said vessel between said liquid inlet and outlet into a plurality of liquid receiving chambers; means mounted in said vessel to project liquid from each of said chambers in a path extending across said passageway to the inner surface of said vessel above said chambers as a plurality of curtains of droplets for intimate contact with gas flowing through said passageway, said droplets having a size and velocity as to be substantially non-entrained by the gas in said passageway, said projected liquid coalescing on said inner surface, said projecting means including a drive shaft rotatably mounted in said vessel and a plurality of impellers mounted at axially spaced intervals on said shaft and extending into each of said chambers, each of said impellers being hollow to define a liquid receiving space and including an inlet to said space and restricted outlet means disposed annularly outside of said space to retard the flow of liquid from said space through said outlet means so that the liquid is projected substantially uniformly from the entire periphery of the impeller above the surface of the liquid in said chambers; a plurality of upright guide members mounted at axially spaced intervals on said inner surface between said gas inlet and outlet above said impellers, said members extending across the top and down a major portion of the sides of said vessel above said dams and projecting inwardly a short distance from said surface to form channels between said members to limit movement on said surface axially of said vessel of substantially all of said coalesced liquid to the width of one of said channels and to direct said coalesced liquid in downward flow paths in said channels; each one of said dams having its top spaced between the edges of the flow path in one of said channels which is positioned in the path of liquid projected from the impeller immediately upstream of said one dam so that different portions of the liquid projected from each chamber are returned to the same chamber and to the next downstream chamber respectively on opposite sides of the dam therebetween; a plurality of troughs positioned in said chambers to extend above the surface of the liquid in said chambers and closely surrounding the lower portions of said impellers, each of said troughs having an inlet in communication with its associated chamber below the tops of the adjacent dams to direct the flow of liquid from said chamber into the associated impeller through the inlet to said space thereby preventing overflow of liquid across the dams and causing the liquid in each of the chambers to be projected by the impellers before passing to the next downstream chamber, and inflector means positioned in said passageway to render said axial gas flow more turbulent and more uniform across said passageway.

8. An apparatus as recited in claim 7 wherein said inflector means comprises a plurality of members positioned at axially spaced locations in said passageway, each of said members having interspersed inflecting surfaces and openings for the passage of gas, the ratio of the area of said inflecting surfaces to the area of said openings being greater near the center than near the edges of said passageway.

9. A method for contacting liquids and gases which comprises conducting a liquid through a plurality of successive stages in the lower portion of a generally horizontal elongated tube, in each such stage collecting said liquid in a relatively non-turbulent pool, continuously projecting liquid from each of said pools across the interior of the tube as a plurality of generally arcuate curtains of droplets distributed substantially uniformly around the circumference of each of said curtains without substantially agitating said pools, colescing and collecting said projected liquid within said tube in a plurality of separate downwardly flowing streams while limiting to the width of one of said streams movement axially of said tube of substantially all of said projected liquid from the time it is projected until its return to said pools, dividing the coalesced liquid in each of said streams into two predetermined portions of the liquid projected from each of said stages, returning one of said portions from each of said streams to the liquid pool of the same stage from which it was last projected, conducting the other portion from each of said streams to the pool of the next succeeding stage, and conducting vapor through said plurality of curtains in an essentially straight-through flow path longitudinally in said tube in a direction counter to the direction of progression of said liquid to effect multiple successive contacts of extensive fresh surfaces of liquid with vapor and to promote progressive interchange of components between said liquid and said vapor, said droplets having a size and velocity as to be substantially non-entrained in said vapor.

10. A method as recited in claim 9 wherein said droplets have a diameter in the range of from about 0.1 mm. to about 2.0 mm.

11. A method as recited in claim 9 wherein pools and streams are vertically offset from each other and said coalesced liquid is divided at the downstream ends of each of said pools.

12. A method as recited in claim 9 wherein pools and streams are in substantial alignment vertically and said coalesced liquid is divided intermediate the length of each of said pools.

13. An apparatus for contacting a gas and a liquid comprising a generally horizontal elongated vessel having a gas inlet and outlet at opposite ends of said vessel and a liquid inlet and outlet at opposite ends of said vessel, said vessel having a gas passageway in the upper portion thereof extending between said gas inlet and outlet, a plurality of transverse dams mounted at spaced locations in said vessel between said liquid inlet and outlet to divide the lower portion of said vessel into a plurality of liquid receiving chambers, spray means positioned in said chambers to remove a large volume of liquid from each of said chambers to maintain the liquid level in said chambers below the tops of said dams and to project said removed liquid as a plurality of spaced curtains of droplets across said passageway for intimate contact with gas passing through said passageway so that said droplets impinge against and coalesce on an inner surface of said vessel, a plurality of transverse guide members mounted in said vessel at axially spaced locations, said droplets having a size and velocity as to be substantially non-entrained in the gas in said passageway, said members extending continuously around the upper portion of said vessel above said dams and projecting inwardly a short distance from said surface into said passageway to divide the upper portion of said vessel into a plurality of separate channels in which the coalesced liquid descends in flow paths, each of said channels being positioned in the path of one of said spray means to receive substantially all of the liquid projected by said one spray means to prevent substantial intermixing on said surface of liquid sprayed from separate chambers, and means to divide the coalesced liquid in said channels into separate portions, to return one of said portions for projection by the same spray means from which it was last projected and to direct another of said portions to the next downstream spray means.

14. An apparatus as recited in claim 13 wherein said spray means comprises a plurality of impellers mounted at axially spaced intervals in said vessel and extending into said chambers, each of said impellers being hollow to define a liquid receiving space and including an inlet to said space and restricted outlet means disposed annularly outside of said space to retard the outward flow of liquid from said space so that said liquid is projected substantially uniformly from the entire periphery of said impellers above the liquid in said chambers, means to rotate said impellers, and means enclosing the lower portions of said impellers to admit liquid from said chambers only through said impeller inlets.

15. An apparatus as recited in claim 14 wherein said dams define openings to permit axial flow of liquid between said chambers, said enclosing means are spaced between said dams and situated between the edges of the flow paths in said channels to divide said coalesced liquid.

16. An apparatus for contacting a gas and a liquid comprising a generally horizontal elongated vessel having a gas passageway extending longitudinally through the upper portion of said vessel, a gas inlet and outlet at opposite ends of said vessel and a liquid inlet and outlet at opposite ends of said vessel; a plurality of transverse dams dividing the lower portion of said vessel between said liquid inlet and outlet into a plurality of liquid receiving chambers; means mounted in said vessel to project liquid from each of said chambers in a path extending across said passageway to the inner surface of said vessel above said chambers as a plurality of curtains of droplets for intimate contact with gas flowing through said passageway, said droplets having a size and velocity as to be substantially non-entrained by the gas in said passageway, said projected liquid coalescing on said inner surface, said projecting means including a drive shaft rotatably mounted in said vessel and a plurality of impellers mounted at axially spaced intervals on said shaft and extending into each of said chambers, each of said impellers being hollow to define a liquid receiving space and including an inlet to said space and outlet means disposed annularly outside of said space; a plurality of upright guide members mounted at axially spaced intervals on said inner surface between said gas inlet and outlet above said impellers, said members extending across the top and down at least a major portion of the sides of said vessel above said dams and projecting inwardly a short distance from said surface to form channels between said members to limit movement on said surface axially of said vessel of substantially all of said coalesced liquid to the width of one of said channels and to direct said coalesced liquid in downward flow paths in said channels; and a plurality of troughs positioned in said chambers to extend above the surface of the liquid in said chambers and closely surrounding the lower portions of said impellers, each of said troughs having an inlet in communication with its associated chamber to direct the flow of liquid from said chamber into the associated impeller through the inlet to said space to cause the liquid in each of the chambers to be projected by the impellers before passing to the next downstream chamber, said dams and troughs comprising in combination means to divide the coalesced liquid in each of said channels into different portions, to return one of said portions to the same impeller from which it was last projected and to direct another of said portions to the next downstream impeller.

17. An apparatus as recited in claim 16 wherein said dams are situated between the edges of the flow paths in said channels to divide said coalesced liquid.

18. An apparatus as recited in claim 16 wherein said dams define openings to permit axial flow of liquid between said chambers, said troughs are spaced between said dams and situated between the edges of the flow paths in said channels to divide said coalesced liquid.

19. An apparatus for contacting a gas and a liquid comprising a generally horizontal elongated vessel having a gas inlet and outlet at opposite ends of said vessel and a liquid inlet and outlet at opposite ends of said vessel, said vessel having a gas passageway in the upper portion thereof extending between said gas inlet and outlet, a plurality of transverse dams mounted at spaced locations in said vessel between said liquid inlet and outlet to divide the lower portion of said vessel into a plurality of liquid receiving chambers, spray means positioned in said chambers to remove a large volume of liquid from each of said chambers to maintain the liquid level in said chambers below the tops of said dams and to project said removed liquid as a plurality of spaced curtains of droplets across said passageway for intimate contact with gas passing through said passageway so that said droplets impinge against and coalesce on an inner surface of said vessel, a plurality of transverse guide members mounted in said vessel at axially spaced locations, said droplets having a size and velocity as to be substantially non-entrained by the gas in said passageway, said members extending continuously around the upper portion of said vessel above said dams and projecting inwardly a short distance from said surface into said passageway to divide the upper portion of said vessel into a plurality of separate channels in which the coalesced liquid descends in flow paths, each of said channels being positioned in the path of one of said spray means to receive substantially all of the liquid projected by said one spray means to prevent substantial intermixing on said surface of liquid sprayed from separate chambers, means to divide the coalesced liquid in said channels into separate portions, to return one of said portions for projection by the same spray means from which it was last projected and to direct another of said portions to the next downstream spray means, and inflector means positioned in said passageway to render said longitudinal gas flow more turbulent and more uniform across said passageway.

20. An apparatus as recited in claim 19 wherein said dams define openings to permit axial flow of liquid between said chambers, said enclosing means are spaced between said dams and situated between the edges of the flow paths in said channels to divide said coalesced liquid, and said inflector means comprises a plurality of members positioned at axially spaced locations in said passageway, each of said members having interspersed inflecting surfaces and openings for the passage of gas, the ratio of the area of said inflecting surfaces to the area of said openings being greater near the center than near the edges of said passageway.

References Cited by the Examiner

UNITED STATES PATENTS

| | | | |
|---|---|---|---|
| 389,785 | 9/88 | Allen | 261—92 |
| 551,694 | 12/95 | Slocum | 261—92 |
| 1,296,013 | 3/19 | Schlossstein | 261—92 |
| 1,893,667 | 1/33 | Darlington. | |
| 1,948,278 | 2/34 | Payne et al. | 261—92 |
| 1,958,586 | 5/34 | Miller | 261—92 |
| 2,156,925 | 5/39 | Siedle | 261—92 |
| 2,774,655 | 12/56 | Marullo et al. | 261—92 |
| 2,871,250 | 1/59 | Eckey | 261—92 X |

FOREIGN PATENTS

| | | |
|---|---|---|
| 422 | 2/77 | Great Britain. |
| 609,180 | 5/26 | France. |
| 47,764 | 4/30 | Norway. |
| 848,818 | 9/60 | Great Britain. |

HARRY B. THORNTON, *Primary Examiner.*

REUBEN FRIEDMAN, *Examiner.*